United States Patent
Lee

(10) Patent No.: US 12,493,383 B2
(45) Date of Patent: Dec. 9, 2025

(54) DISPLAY DEVICE, DRIVING METHOD THEREOF, AND ELECTRONIC DEVICE

(71) Applicant: SAMSUNG DISPLAY CO., LTD., Yongin-si (KR)

(72) Inventor: Choon Hyop Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/971,988

(22) Filed: Dec. 6, 2024

(65) Prior Publication Data
US 2025/0362773 A1    Nov. 27, 2025

(30) Foreign Application Priority Data

May 21, 2024    (KR) .......................... 10-2024-0065672

(51) Int. Cl.
*G06F 3/041*    (2006.01)
*G06F 3/044*    (2006.01)

(52) U.S. Cl.
CPC ........ *G06F 3/0418* (2013.01); *G06F 3/04166* (2019.05); *G06F 3/0446* (2019.05); *G06F 2203/04111* (2013.01)

(58) Field of Classification Search
CPC .. G06F 3/04166; G06F 3/0418; G06F 3/0446; G06F 2203/04111
See application file for complete search history.

(56) References Cited

U.S. PATENT DOCUMENTS

| | | | |
|---|---|---|---|
| 11,543,914 B2 * | 1/2023 | Lee ..................... | G06F 3/04166 |
| 11,735,103 B2 * | 8/2023 | Park .................... | H03F 3/45475 |
| | | | 345/204 |
| 11,886,671 B2 | 1/2024 | Kim et al. | |
| 11,899,878 B2 * | 2/2024 | Lee ..................... | G06F 3/04164 |
| 2012/0146943 A1 * | 6/2012 | Fairley ................. | G06F 3/0446 |
| | | | 345/174 |
| 2022/0326832 A1 * | 10/2022 | Lee ......................... | G06F 3/044 |
| 2023/0061354 A1 * | 3/2023 | Park ........................ | H03F 3/70 |

FOREIGN PATENT DOCUMENTS

| | | |
|---|---|---|
| KR | 10-2020936 B1 | 11/2019 |
| KR | 10-2022-0140075 A | 10/2022 |
| KR | 10-2023-0071927 A | 5/2023 |

* cited by examiner

*Primary Examiner* — Michael Pervan
(74) *Attorney, Agent, or Firm* — F. CHAU & ASSOCIATES, LLC

(57) ABSTRACT

A display device including: first sensors; second sensors forming a capacitance with the first sensors; a sensor transmitter connected to the first sensors and configured to supply driving signals to the first sensors; and a sensor receiver connected to the second sensors and configured to receive sensing signals from the second sensors, wherein the sensor receiver includes an analog front-end connected to a (2-1)-th sensor and a (2-2)-th sensor of the second sensors, and the analog front-end is configured to output a differential signal of a (2-1)-th sensing signal from the (2-1)-th sensor and a (2-2)-th sensing signal from the (2-2)-th sensor in a first sensing mode, and output each of the (2-1)-th sensing signal and the (2-2)-th sensing signal in a time division manner in a second sensing mode.

21 Claims, 25 Drawing Sheets

<DPM1a>

<DPM3b>

DISPLAY DEVICE, DRIVING METHOD THEREOF, AND ELECTRONIC DEVICE

CROSS-REFERENCE TO RELATED APPLICATION

This application claims priority under 35 U.S.C. § 119 to Korean Patent Application No. 10-2024-0065672 filed in the Korean Intellectual Property Office on May 21, 2024, the disclosure of which is incorporated by reference herein in its entirety.

(a) TECHNICAL FIELD

The present disclosure relates to a display device, a driving method thereof, and an electronic device.

(b) DESCRIPTION OF THE RELATED ART

As information technology advances, display devices, which serve as the interface between users and information, are becoming increasingly important. Accordingly, the use of display devices such as liquid crystal displays, and organic light emitting displays has been increasing.

The display device can receive a user's input through a touch sensor. Such a touch sensor must maintain constant touch sensitivity despite changes in temperature and sensor deterioration.

SUMMARY

Embodiments of the present disclosure provide a display device, a driving method, and an electronic device that may maintain constant touch sensitivity despite temperature fluctuations and sensor degradation.

An embodiment of the present disclosure provides a display device including: first sensors; second sensors forming a capacitance with the first sensors; a sensor transmitter connected to the first sensors and configured to supply driving signals to the first sensors; and a sensor receiver connected to the second sensors and configured to receive sensing signals from the second sensors, wherein the sensor receiver includes an analog front-end connected to a (2-1)-th sensor and a (2-2)-th sensor of the second sensors, and the analog front-end is configured to output a differential signal of a (2-1)-th sensing signal from the (2-1)-th sensor and a (2-2)-th sensing signal from the (2-2)-th sensor in a first sensing mode, and output each of the (2-1)-th sensing signal and the (2-2)-th sensing signal in a time division manner in a second sensing mode.

The differential signal outputted in the first sensing mode is used to determine a touch position, and the (2-1)-th sensing signal outputted in the second sensing mode is set as a baseline of the (2-1)-th sensor, and the (2-2)-th sensing signal outputted in the second sensing mode is set as a baseline of the (2-2)-th sensor.

When the display device operates in the first display mode, the analog front-end operates only in the first sensing mode, and when the display device operates in the second display mode, the analog front-end alternates between the first sensing mode and the second sensing mode.

When the display device operates in a third display mode, the analog front-end operates only in the second sensing mode.

The first display mode is a normal display mode in which an image is displayed, the second display mode is an idle display mode in which an image is displayed, but no user input is detected for a certain period of time, and the third display mode is a low-power display mode in which no image is displayed, or only minimal information is displayed.

The analog front-end includes a first charge amplifier and a second charge amplifier, in the first sensing mode, the (2-1)-th sensor and the (2-2)-th sensor are connected to a first input terminal and a second input terminal of the first charge amplifier, and in the second sensing mode, the (2-1)-th sensor is connected to the first input terminal of the first charge amplifier, and the (2-2)-th sensor is connected to a first input terminal of the second charge amplifier.

The first charge amplifier is a fully differential amplifier, and the second charge amplifier is a differential amplifier with a single-ended output.

In the second sensing mode, the second input terminal of the first charge amplifier is connected to a reference node.

The analog front-end further includes a first filter circuit connected to output terminals of the first charge amplifier; a second filter circuit connected to an output terminal of the second charge amplifier; and an analog-to-digital converter.

In the first sensing mode, output terminals of the first filter circuit are connected to the analog-to-digital converter, and in the second sensing mode, a first output terminal of the first filter circuit and an output terminal of the second filter circuit are alternately connected to the analog-to-digital converter.

An embodiment of the present disclosure provides a driving method of a display device including: supplying, by a sensor transmitter, driving signals to first sensors; and receiving, by a sensor receiver, sensing signals from second sensors that form a capacitance with the first sensors, wherein the sensor receiver includes an analog front-end connected to a (2-1)-th sensor and a (2-2)-th sensor of the second sensors, and the analog front-end outputs a differential signal of a (2-1)-th sensing signal from the (2-1)-th sensor and a (2-2)-th sensing signal from the (2-2)-th sensor in a first sensing mode, and outputs the (2-1)-th sensing signal and the (2-2)-th sensing signal in a time division manner in a second sensing mode.

The differential signal outputted in the first sensing mode is used to determine a touch position, and the (2-1)-th sensing signal outputted in a second sensing mode is set as a base line of the (2-1)-th sensor, and the (2-2)-th sensing signal outputted in the second sensing mode is set as a base line of the (2-2)-th sensor.

When the display device operates in the first display mode, the analog front-end operates only in the first sensing mode, and when the display device operates in the second display mode, the analog front-end alternates between the first sensing mode and the second sensing mode.

When the display device operates in a third display mode, the analog front-end operates only in the second sensing mode.

The first display mode is a normal display mode in which an image is displayed, the second display mode is an idle display mode in which an image is displayed, but no user input is detected for a certain period of time, and the third display mode is a low-power display mode in which no image is displayed, or only minimal information is displayed.

The analog front-end includes a first charge amplifier and a second charge amplifier, in the first sensing mode, the (2-1)-th sensor and the (2-2)-th sensor are connected to a first input terminal and a second input terminal of the first charge amplifier, and in the second sensing mode, the (2-1)-th sensor is connected to the first input terminal of the first charge amplifier, and the (2-2)-th sensor is connected to a first input terminal of the second charge amplifier.

The first charge amplifier is a fully differential amplifier, and the second charge amplifier is a differential amplifier with a single-ended output.

In the second sensing mode, the second input terminal of the first charge amplifier is connected to a reference node.

The analog front-end further includes: a first filter circuit connected to output terminals of the first charge amplifier; a second filter circuit connected to an output terminal of the second charge amplifier; and an analog-to-digital converter.

In the first sensing mode, output terminals of the first filter circuit are connected to the analog-to-digital converter, and in the second sensing mode, a first output terminal of the first filter circuit and an output terminal of the second filter circuit are alternately connected to the analog-to-digital converter.

An embodiment of the present disclosure provides an electronic device including: a processor to provide input image data; and a display device to display an image based on the input image data, the display device including: first sensors; second sensors forming a capacitance with the first sensors; a sensor transmitter connected to the first sensors and configured to supply driving signals to the first sensors; and a sensor receiver connected to the second sensors and configured to receive sensing signals from the second sensors. The sensor receiver includes an analog front-end connected to a (2-1)-th sensor and a (2-2)-th sensor of the second sensors, and the analog front-end is configured to output a differential signal of a (2-1)-th sensing signal from the (2-1)-th sensor and a (2-2)-th sensing signal from the (2-2)-th sensor in a first sensing mode, and output each of the (2-1)-th sensing signal and the (2-2)-th sensing signal in a time division manner in a second sensing mode.

The display device, the driving method, and the electronic device according to the present disclosure may maintain constant touch sensitivity in response to temperature changes and sensor deterioration.

DETAILED DESCRIPTION OF THE EMBODIMENTS

Figure 1:
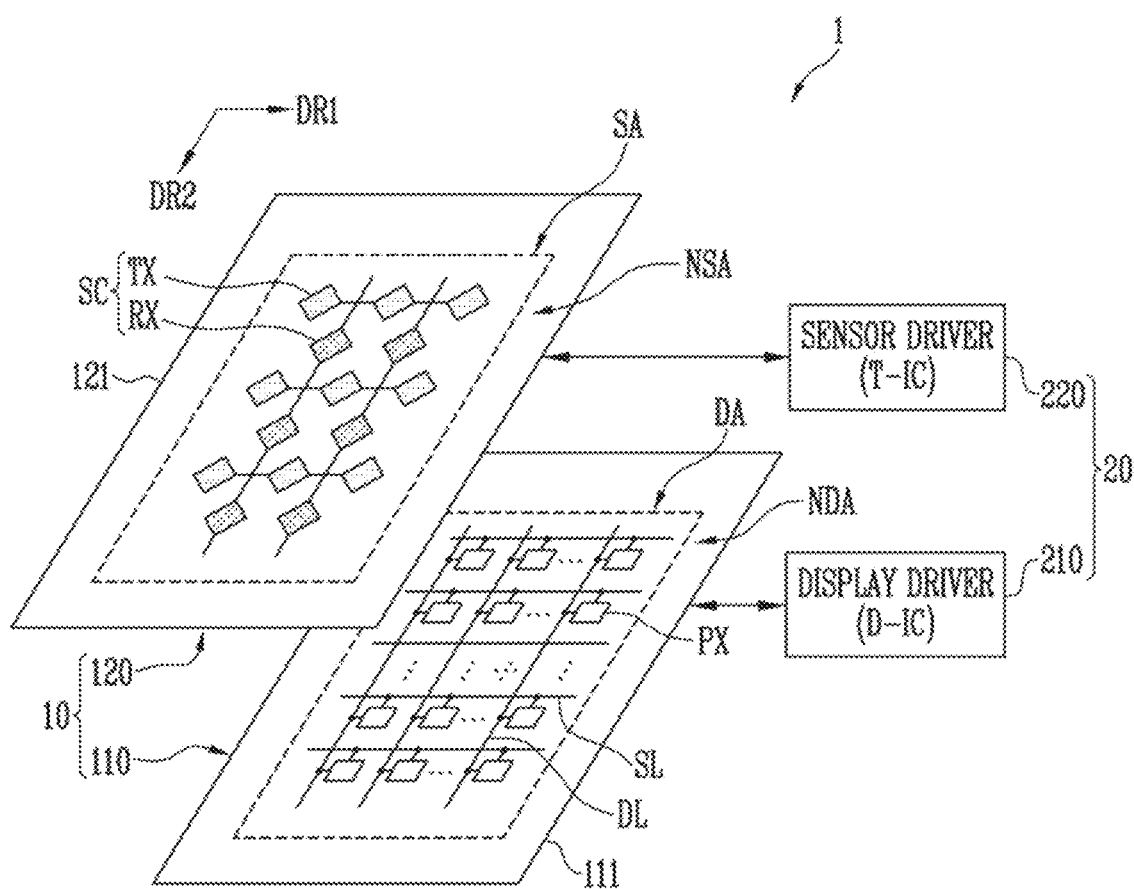
FIG. 1 and FIG. 2 are drawings for explaining a display device according to an embodiment of the present disclosure.

The present disclosure will be described more fully hereinafter, with reference to the accompanying drawings that illustrate embodiments of the disclosure. It should be understood by those skilled in the art that these embodiments may be modified in various ways without departing from the spirit or scope of the present disclosure.

To provide a clear explanation of the present disclosure, parts irrelevant to the description are omitted, and identical or similar elements throughout the specification are denoted by the same reference numerals, which may also be used in other drawings.

Further, the size and thickness of each element in the drawings are illustrated arbitrarily for ease of description, and the present disclosure is not limited by the drawings. In the drawings, the thicknesses of layers, films, panels, regions, areas, etc. may be exaggerated for clarity.

In addition, the term "same" in the description may imply "substantially the same."

In other words, it may be sufficiently similar to be considered the same by those skilled in the art. Other expressions used may also omit the term "substantially".

Figure 2:
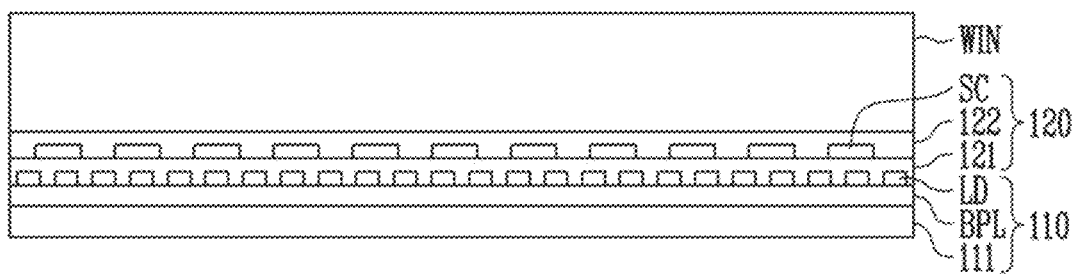

FIG. 1 and FIG. 2 are drawings for explaining a display device according to an embodiment of the present disclosure.

Referring to FIG. 1, a display device 1 according to an embodiment of the present disclosure may include a panel 10 and a driving circuit portion 20 for driving the panel 10.

For example, the panel 10 may include a display portion 110 for displaying an image and a sensor portion 120 for sensing touch, pressure, fingerprints, and hovering. For example, the panel 10 may include pixels PX, and sensors SC that overlap at least some of the pixels PX. In the embodiment, the sensors SC may include first sensors TX and second sensors RX. In another embodiment (for example, a self-capacitance method), the sensors SC may be configured as a single type, without distinction between the first sensors and the second sensors. The driving circuit portion 20 may include a display driver 210 for driving the display portion 110 and a sensor driver 220 for driving the sensor portion 120. For example, the pixels PX may display an image in units of a display frame period. For example, the sensors SC may sense a user input in units of a sensing frame period. The sensing frame period and the display frame period may operate independently and may be different from each other. The sensing frame period and the display frame period may be synchronized, or not.

In some embodiments, the display portion 110 and the sensor portion 120 may be separately manufactured and then positioned and/or combined so that at least one area overlaps. Alternatively, in another embodiment, the display portion 110 and the sensor portion 120 may be integrally manufactured. For example, the sensor portion 120 may be directly formed on at least one substrate (for example, an upper and/or lower substrate of a display panel, or a thin film encapsulation layer) that forms the display portion 110, or on other insulation layers or various functional films (for example, an optical layer or a passivation layer).

In FIG. 1, the sensor portion 120 is shown to be disposed on a front surface (for example, an upper surface on which an image is displayed) of the display portion 110, but the position of the sensor portion 120 is not limited thereto. For example, in another embodiment, the sensor portion 120 may be disposed on a rear surface or on respective surfaces of the display portion 110. In another embodiment, the sensor portion 120 may be disposed on at least one edge area of the display portion 110.

The display portion 110 may include a display substrate 111 and a plurality of pixels PX formed on the display substrate 111. The pixels PX may be disposed in a display area DA of the display substrate 111.

The display substrate 111 may include the display area DA in which an image is displayed and a non-display area NDA outside the display area DA. In some embodiments, the display area DA may be disposed in a central area of the display portion 110, and the non-display area NDA may be disposed in an edge area of the display portion 110 to surround the display area DA.

The display substrate 111 may be a rigid substrate or a flexible substrate, and its material or physical properties are not particularly limited. For example, the display substrate 111 may be a rigid substrate made of glass or tempered glass, or a flexible substrate formed of a thin film made of plastic or a metallic material.

In the display area DA, scan lines SL and data lines DL, and the pixels PX connected to the scan lines SL and the data lines DL are arranged. The pixels PX are selected by a turn-on level of a scan signal supplied from the scan lines SL, allowing them to receive a data signal from the data lines DL and emit light with luminance corresponding to that data signal. Accordingly, an image corresponding to the data signal is displayed in the display area DA. In the present invention, the structure and driving method of pixels PX are not particularly limited. For example, each pixel PX may be implemented using various structures and driving methods that are currently known.

In the non-display area NDA, various wires connected to the pixels PX of the display area DA and/or internal circuit portions may be arranged. For example, in the non-display area NDA, a plurality of wires for supplying various power sources and control signals to the display area DA may be arranged, and a scan driver or similar components may also be additionally positioned.

In the present invention, the type of the display portion 110 is not particularly limited. For example, the display portion 110 may be implemented as a self light emitting type display panel such as an organic light emitting display panel. However, when the display portion 110 is implemented as a self-light emitting type, each pixel PX is not limited to a case where only an organic light emitting element is included. For example, the light emitting element of each pixel PX may include an organic light emitting diode, an inorganic light emitting diode, and a quantum dot/well light emitting diode. Each pixel PX may be provided with a plurality of light emitting elements. In this case, the plurality of light emitting elements may be connected in series, in parallel, or in series/parallel. Alternatively, the display portion 110 may be implemented as a non-light emitting type of display panel such as a liquid crystal display panel. When the display portion 110 is implemented in a non-light emitting type, the display device 1 may additionally include a light source such as a back-light unit.

The sensor portion 120 includes a sensor substrate 121 and the plurality of sensors SC formed on the sensor substrate 121. The sensors SC may be disposed in a sensing area SA on the sensor substrate 121.

The sensor substrate 121 may include the sensing area SA capable of sensing a touch input or the like, and a peripheral area NSA outside the sensing area SA. In some embodiments, the sensing area SA may overlap at least one area of the display area DA. For example, the sensing area SA may be an area corresponding to the display area DA (for example, an area overlapping the display area DA), and the peripheral area NSA may be an area corresponding to the non-display area NDA (for example, an area overlapping the non-display area NDA). In this case, when a touch input or the like is provided on the display area DA, it is possible to detect the touch input through the sensor portion 120.

The sensor substrate 121 may be a rigid or flexible substrate, and may be configured as at least one insulating film. In addition, the sensor substrate 121 may be a transparent or translucent transmissive substrate, but is not limited thereto. In other words, in the present disclosure, the material and physical properties of the sensor substrate 121 are not particularly limited. For example, the sensor substrate 121 may be a rigid substrate made of glass or tempered glass, or a flexible substrate formed of a thin film made of plastic or a metallic material. In addition, in some embodiments, at least one substrate forming the display portion 110 (for example, the display substrate 111, an encapsulation substrate and/or a thin film encapsulation layer), or at least one layer of insulating or functional film disposed on an inner and/or outer surface of the display portion 110, may also serve as the sensor substrate 121.

The sensing area SA is an area capable of reacting to a touch input (in other words, an active area of a sensor). To achieve this, the sensors SC for sensing the touch input or the like may be disposed in the sensing area SA. In some embodiments, the sensors SC may include the first sensors TX and the second sensors RX.

For example, respective first sensors TX may extend in a first direction DR1. The first sensors TX may be arranged in a second direction DR2. The second direction DR2 may be different from the first direction DR1. For example, the second direction DR2 may be a direction orthogonal to the first direction DR1. In another embodiment, the extension direction and arrangement direction of the first sensors TX may follow other conventional configurations. Each of the first sensors TX may have a structure where first cells with a relatively large area are connected to first bridges with a narrower area. In FIG. 1, each first cell is illustrated in a diamond shape, but may be configured in various conventional shapes such as a circle, a quadrangle, a triangle, and a mesh form. For example, the first bridges may be integrally formed on the same layer as the first cells. In another embodiment, the first bridges may be formed in a different layer from the first cells to electrically connect adjacent first cells.

For example, each second sensor RX may extend in the second direction DR2. The second sensors RX may be arranged in the first direction DR1. In another embodiment, the extension direction and arrangement direction of the second sensors RX may follow other conventional configurations. Each second sensor RX may have a structure where second cells with a relatively large area are connected to second bridges with a narrower area. In FIG. 1, each second cell is illustrated in a diamond shape, but may be configured in various conventional shapes such as a circle, a quadrangle, a triangle, and a mesh form. For example, the second bridges may be integrally formed on the same layer as the second cells. In another embodiment, the second bridges may be formed in a different layer from the second cells to electrically connect adjacent second cells.

In some embodiments, each of the first sensors TX and the second sensors RX may exhibit conductivity by including at least one of a metallic material, a transparent conductive material, and various other conductive materials. For example, the first sensors TX and the second sensors RX may include at least one of various metallic materials such as gold (Au), silver (Ag), aluminum (Al), molybdenum (Mo), chromium (Cr), titanium (Ti), nickel (Ni), neodymium (Nd), copper (Cu), and platinum (Pt), or an alloy thereof. In this case, the first sensors TX and the second sensors RX may be configured in a mesh form. In addition, the first sensors TX and the second sensors RX may include at least one of various transparent conductive materials such as a silver nanowire (AgNW), an indium tin oxide (ITO), an indium zinc oxide (IZO), an indium gallium zinc oxide (IGZO), an antimony zinc oxide (AZO), an indium tin zinc oxide (ITZO), a zinc oxide (ZnO), a tin oxide (SnO2), a carbon nano tube, and a graphene. In addition, the first sensors TX and the second sensors RX may have conductivity by including at least one of various other conductive materials. In addition, each of the first sensors TX and the second sensors RX may be made of a single layer or multilayer, and the cross-sectional structure thereof is not particularly limited.

In the peripheral area NSA of the sensor portion 120, sensor lines for electrically connecting the sensors TX and RX to the sensor driver 220 and the like may be mostly arranged.

The driving circuit 20 may include the display driver 210 for driving the display portion 110 and the sensor driver 220 for driving the sensor portion 120. In the embodiment, the display driver 210 and the sensor driver 220 may be configured of separate integrated chips from each other. In another embodiment, at least a portion of the display driver 210 and the sensor driver 220 may be integrated together in one IC.

The display driver 210 is electrically connected to the display portion 110 to drive the pixels PX. For example, the display driver 210 may include a data driver and a timing controller, and a scan driver may be separately mounted in the non-display area NDA of the display portion 110. In another embodiment, the display driver 210 may include all or at least some of the data driver, the timing controller, and the scan driver. In another embodiment, the display driver 210 may correspond to at least one of a graphics processing unit (GPU), a central processing unit (CPU), and an application processor (AP). In another embodiment, the display driver 210 may refer to a set of at least one of a GPU, a CPU, and an AP and a timing controller.

The sensor driver 220 is electrically connected to the sensor portion 120 to drive the sensor portion 120. The sensor driver 220 may include a sensor transmitter and a sensor receiver. In some embodiments, the sensor transmitter and the sensor receiver may be integrated into one IC, but the present disclosure is not limited thereto.

Referring to FIG. 2, for example, the sensor portion 120 may be stacked on the display portion 110, and a window WIN may be stacked on the sensor portion 120.

The display portion 110 may include the display substrate 111, a circuit element layer BPL formed on the display substrate 111, and light emitting elements LD formed on the circuit element layer BPL. The circuit element layer BPL may include the pixel circuits, the scan lines SL, the data lines DL, and the like for driving the light emitting elements LD of the pixels PXL.

The sensor portion 120 may include the sensor substrate 121, sensors SC formed on the sensor substrate 121, and a passivation film 122 covering the sensors SC. In the embodiment of FIG. 2, the sensor substrate 121 is shown in a form of an encapsulation film covering the pixels PXL. In another embodiment, the sensor substrate 121 may be separate from the encapsulation film covering the pixels PXL.

The window WIN may be a protective member disposed at an uppermost portion of a module of the display device 1, and may be a substantially transparent transmissive substrate. The window WIN may have a multi-layered structure selected from a glass substrate, a plastic film, and a plastic substrate. The window WIN may include a rigid or flexible substrate, and the material included in the window WIN is not particularly limited.

The display device 1 may further include a polarizing plate (or another type of anti-reflection layer) for preventing reflection of external light between the window WIN and the sensor portion 120.

Figure 3:
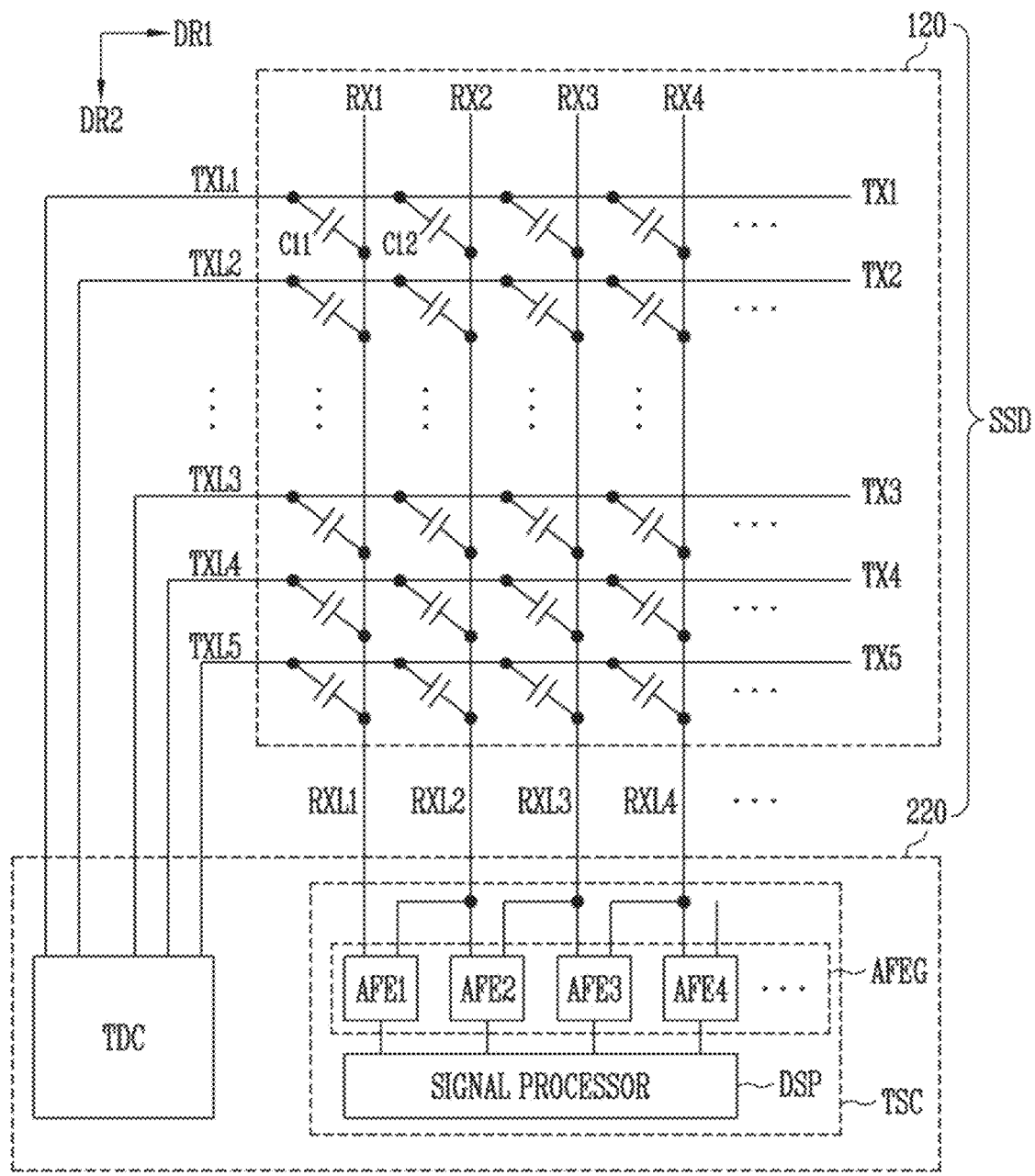
FIG. 3 is a drawing for explaining a sensor device according to an embodiment of the present disclosure.

FIG. 3 is a drawing for explaining a sensor device according to an embodiment of the present disclosure.

Referring to FIG. 3, a sensor device SSD according to an embodiment of the present disclosure may include the sensor portion 120 and the sensor driver 220. The sensor device SSD may be included inside the display device 1. The sensor device SSD may be configured as a separate independent product that can function independently of the display device 1.

The sensor portion 120 may include first sensors TX1, TX2, TX3, TX4, and TX5 and second sensors RX1, RX2, RX3, and RX4. The first sensors TX1 to TX5 may extend in the first direction DR1 and may be arranged in the second direction DR2. The second sensors RX1 to RX4 may extend in the second direction DR2, and may be arranged in the first direction DR1. The second sensors RX1 to RX4 may intersect the first sensors TX1 to TX5. The first sensors TX1 to TX5 and the second sensors RX1 to RX4 may form mutual capacitance. For example, a capacitance C11 may be formed between the (1-1)-th sensor TX1 and the (2-1)-th sensor RX1, and a capacitance C12 may be formed between the (1-1)-th sensor TX1 and the (2-2)-th sensor RX2. The sensor driver 220 may detect changes in the capacitances (C11, C12, . . . ) to determine whether or not a user inputs a touch.

The sensor driver 220 may include a sensor transmitter TDC and a sensor receiver TSC. The sensor transmitter TDC is connected to the first sensors TX1 to TX5, and may supply driving signals to the first sensors TX1 to TX5. The sensor transmitter TDC may be connected to the first sensors TX1 to TX5 through first sensor lines TXL1, TXL2, TXL3, TXL4, and TXL5.

The sensor receiver TSC is connected to the second sensors RX1 to RX4, and may receive sensing signals from the second sensors RX1 to RX4. The sensor receiver TSC may be connected to the second sensors RX1 to RX4 through second sensor lines RXL1, RXL2, RXL3, and RXL4. The sensor receiver TSC may include an analog front-end group AFEG and a signal processor DSP.

The analog front-end group AFEG may include a plurality of analog front-ends AFE1, AFE2, AFE3, and AFE4. Each of the analog front-ends AFE1 to AFE4 may be connected to two adjacent second sensors among the second sensors RX1 to RX4. For example, the first analog front-end AFE1 may be connected to the (2-1)-th sensor RX1 and the (2-2)-th sensor RX2. The second analog front-end AFE2 may be connected to the (2-2)-th sensor RX2 and the (2-3)-th sensor RX3. The third analog front-end AFE3 may be connected to the (2-3)-th sensor RX3 and the (2-4)-th sensor RX4. The fourth analog front-end AFE4 may be connected to the (2-4)-th sensor RX4 and a (2-5)-th sensor (not shown). Since each of the analog front-ends AFE1 to AFE4 may generate a digital signal with common noise removed by using sensing signals of adjacent second sensors, a signal to noise ratio (SNR) may be improved.

The signal processor DSP may calculate sensing values using digital signals provided by the analog front-end group AFEG. For example, the digital signal provided by the first analog front-end AFE1 may correspond to a difference (Iv2−Iv1) between a level Iv2 of the (2-2)-th sensing signal of the (2-2)-th sensor RX2 and a level Iv1 of the (2-1)-th sensing signal of the (2-1)-th sensor RX1. The digital signal provided by the second analog front-end AFE2 may correspond to a difference (Iv3-Iv2) between a level Iv3 of the (2-3)-th sensing signal of the (2-3)-th sensor RX3 and the level Iv2 of the (2-2)-th sensing signal of the (2-2)-th sensor RX2. The digital signal provided by the third analog front-end AFE3 may correspond to a difference (Iv4-Iv3) between a level Iv4 of the (2-4)-th sensing signal of the (2-4)-th sensor RX4 and the level Iv3 of the (2-3)-th sensing signal of the (2-3)-th sensor RX3.

For example, the signal processor DSP may calculate a relative level Iv2' of the (2-2)-th sensing signal of the (2-2)-th sensor RX2, a relative level Iv3' of the (2-3)-th sensing signal of the (2-3)-th sensor RX3, and a relative level Iv4' of the (2-4)-th sensing signal of the (2-4)-th sensor RX4 using the following Equation 1 to Equation 3.

$$Iv2'=Iv2-Iv1=(Iv2-Iv1) \qquad \text{[Equation 1]}$$

$$Iv3'=Iv3-Iv1=(Iv3-Iv2)+(Iv2-Iv1) \qquad \text{[Equation 2]}$$

$$Iv4'=Iv4-Iv1=(Iv4-Iv3)+(Iv3-Iv2)+(Iv2-Iv1) \qquad \text{[Equation 3]}$$

The signal processor DSP may use these levels Iv2', Iv3', and Iv4' as sensing values to determine whether a user has made a touch or to transmit the sensing values to the display driver 210.

Figure 4:
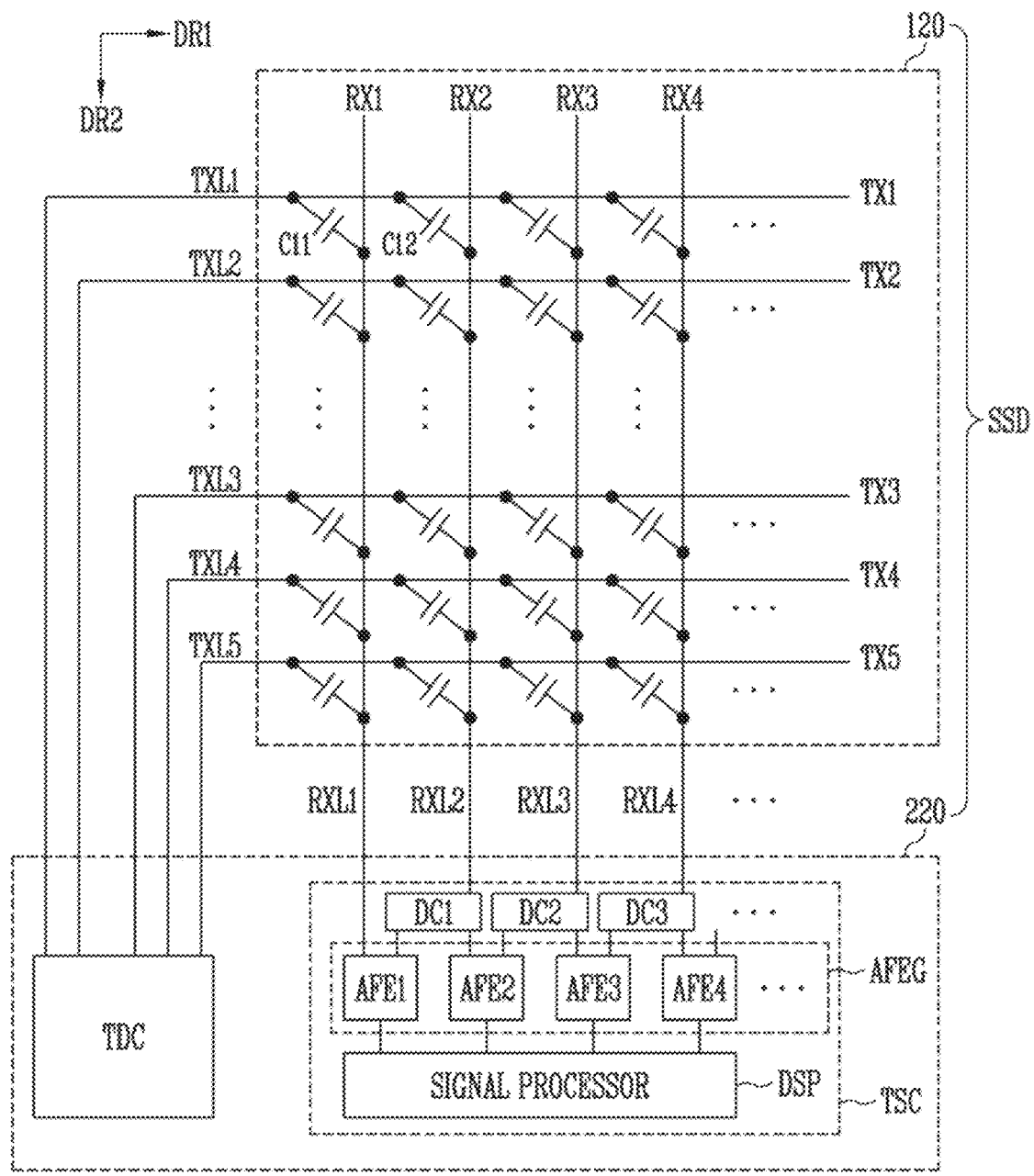
FIG. 4 is a drawing for explaining an analog front-end according to an embodiment of the present disclosure.

FIG. 4 is a drawing for explaining an analog front-end according to an embodiment of the present disclosure.

The sensor receiver TSC of FIG. 4 is different from the sensor receiver TSC of FIG. 3 in that it further includes distribution circuits DC1, DC2, and DC3.

The distribution circuits DC1, DC2, and DC3 are disposed between at least some of the second sensors RX1 to RX4 and the analog front-ends AFE1 to AFE4. The distribution circuits DC1, DC2, and DC3 may may generate a plurality of signals having the same magnitude (for example, the same voltage level or current) based on the sensing signals provided by at least some of the second sensors RX1 to RX4, and distribute the generated signals to the analog front-ends AFE1 to AFE4. For example, the distribution circuits DC1, DC2, and DC3 are configured to include an amplifier, a buffer, and the like, and may amplify or mirror each of the sensing signals to output it.

For example, the first distribution circuit DC1 may receive the (2-2)-th sensing signal provided from the (2-2)-th sensor RX2, and provide signals having the same magnitude as the (2-2)-th sensing signal to the first analog front-end AFE1 and the second analog front-end AFE2, respectively. For reference, when the (2-2)-th sensing signal does not pass through the first distribution circuit DC1, the (2-2)-th sensing signal is simultaneously supplied to the first analog front-end AFE1 and the second analog front-end AFE2. Accordingly, due to a relative increase in the load on the (2-2)-th sensing signal, the magnitude of the (2-2)-th sensing signal may be different from the magnitude of the (2-1)-th sensing signal received from the (2-1)-th sensor RX1. For example, the (2-2)-th sensing signal may be smaller than the (2-1)-th sensing signal. Accordingly, the present embodiment may provide signals having the same magnitude as the (2-2)-th sensing signal to the first analog front-end AFE1 and the second analog front-end AFE2, respectively, using the first distribution circuit DC1.

Similarly, the second distribution circuit DC2 may receive the (2-3)-th sensing signal provided from the (2-3)-th sensor RX3, and provide signals having the same magnitude as the (2-3)-th sensing signal to the second analog front-end AFE2 and the third analog front-end AFE3, respectively. The third distribution circuit DC3 may receive the (2-4)-th sensing signal provided from the (2-4)-th sensor RX4, and provide signals having the same magnitude as the (2-4)-th sensing signal to the third analog front-end AFE3 and the fourth analog front-end AFE4, respectively.

Figure 5:
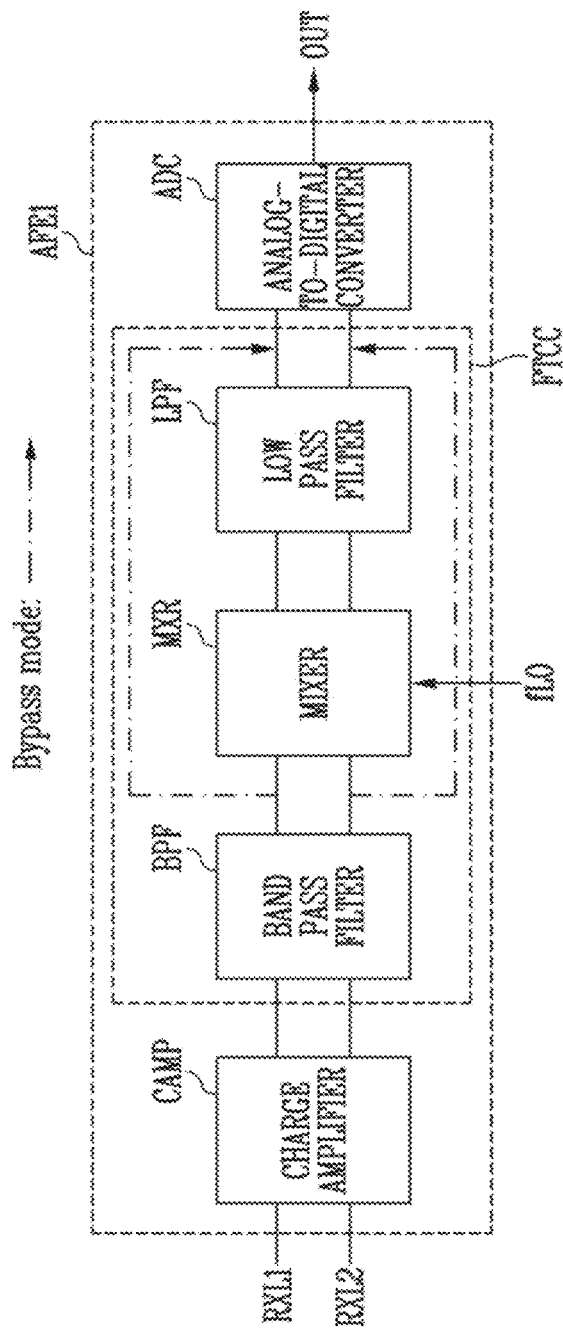
FIG. 5 is a drawing for explaining an analog front-end according to an embodiment of the present disclosure.

FIG. 5 is a drawing for explaining an analog front-end according to an embodiment of the present disclosure.

Referring to FIG. 5, the first analog front-end AFE1 according to an embodiment of the present disclosure may include a charge amplifier CAMP, a filter circuit FTCC, and an analog-to-digital converter ADC. For example, the filter circuit FTCC may include a band pass filter BPF, a mixer MXR, and a low pass filter LPF. The other analog front-ends AFE2, AFE3, and AFE4 may have the same configuration as the first analog front-end AFE1 except for the difference in the second sensors RX connected thereto, therefore duplicate descriptions are omitted (see FIG. 3 and FIG. 4).

The charge amplifier CAMP may receive sensing signals from two RX1 and RX2 of the second sensors RX1 to RX4. For example, in the charge amplifier CAMP, a first input terminal (for example, an inverting terminal) may be connected to the (2-1)-th sensor line RXL1, and a second input terminal (for example, a non-inverting terminal) may be connected to the (2-2)-th sensor line RXL2. Accordingly, the charge amplifier CAMP may output a differential signal representing the difference between the level of the (2-2)-th sensing signal from the (2-2)-th sensor RX2 and the level of the (2-1)-th sensing signal from the (2-1)-th sensor RX1. The charge amplifier CAMP is configured as a fully differential amplifier, and may output both a differential signal corresponding to the difference between the level of the (2-2)-th sensing signal and the level of the (2-1)-th sensing signal and an inverted signal thereof. In FIG. 5, it is assumed that the elements BPF, MXR, LPF, and ADC connected to the output terminal of the charge amplifier CAMP require both an input signal and an inverted input signal, and thus, two internal signal lines are shown in parallel. Each of the elements BPF, MXR, LPF, and ADC has the advantage of being able to remove common mode noise using an input signal and an inverted input signal.

However, in another embodiment, the elements BPF, MXR, LPF, and ADC may be configured to require only an input signal without an inverted input signal. In this case, the output terminal of the charge amplifier CAMP is configured as a single-ended, and may output only a differential signal representing the difference between the level of the (2-2)-th sensing signal and the level of the (2-1)-th sensing signal. In this embodiment, the internal signal lines connecting the charge amplifier CAMP to the respective elements BPF, MXR, LPF, and ADC will be shown as a single line. Hereinafter, for better understanding and ease of description, it is assumed that the charge amplifier CAMP outputs a differential signal and an inverted signal thereof.

The band pass filter BPF may be connected to an output terminal of the charge amplifier CAMP. The band pass filter BPF may filter sensing signals (or a differential signal of sensing signals and an inverted signal thereof). The band pass filter BPF may filter an output signal of the charge amplifier CAMP to have a set frequency band. For example, the frequency band may be preset to include the frequency (or center frequency) of the sensing signals, and the noise components may be positioned outside the frequency band. The center frequencies of the sensing signals may be the same as the center frequencies of the driving signals.

The mixer MXR may mix the output signal of the band pass filter BPF and a local clock signal fLO. The output signal of the mixer MXR may include frequency components corresponding to a difference and a sum of the frequency of the output signal of the band pass filter BPF and the frequency of the local clock signal fLO. For example, when the frequency of the output signal of the band pass filter BPF and the frequency of the local clock signal fLO are the same, the output signal of the mixer MXR may include a frequency component having 0 Hz as the center frequency.

The low pass filter LPF may filter an output signal of the mixer MXR to have a set frequency band. In this case, the set frequency band of the low pass filter LPF may be lower than the set frequency band of the band pass filter BPF. For example, the low pass filter LPF may only pass signals in the low frequency band centered on 0 Hz among the output signals of the mixer MXR. Thus, the low pass filter LPF may filter frequency components corresponding to noise.

The analog-to-digital converter ADC may convert an output signal of the low pass filter LPF into a digital signal OUT. Since the analog-to-digital converter ADC receives a low frequency signal from the low pass filter LPF, it can operate at a lower sampling rate. As a result, the clock signal frequency can be reduced, leading to lower power and reduced configuration costs.

The signal processor DSP may determine the final sensing values using the digital signals OUT outputted from the respective analog front-ends AFE1, AFE2, AFE3, and AFE4 (see FIG. 3 and Equation 1 to Equation 3).

However, when the sensor receiver operates in a bypass mode, the functions of the mixer MXR and the low pass filter LPF may be performed digitally in the signal processor DSP. In this case, the output of the band pass filter BPF may be directly transmitted to the input of the analog-to-digital converter ADC. As such, certain components of the filter circuit FTCC may be omitted.

Figure 6:
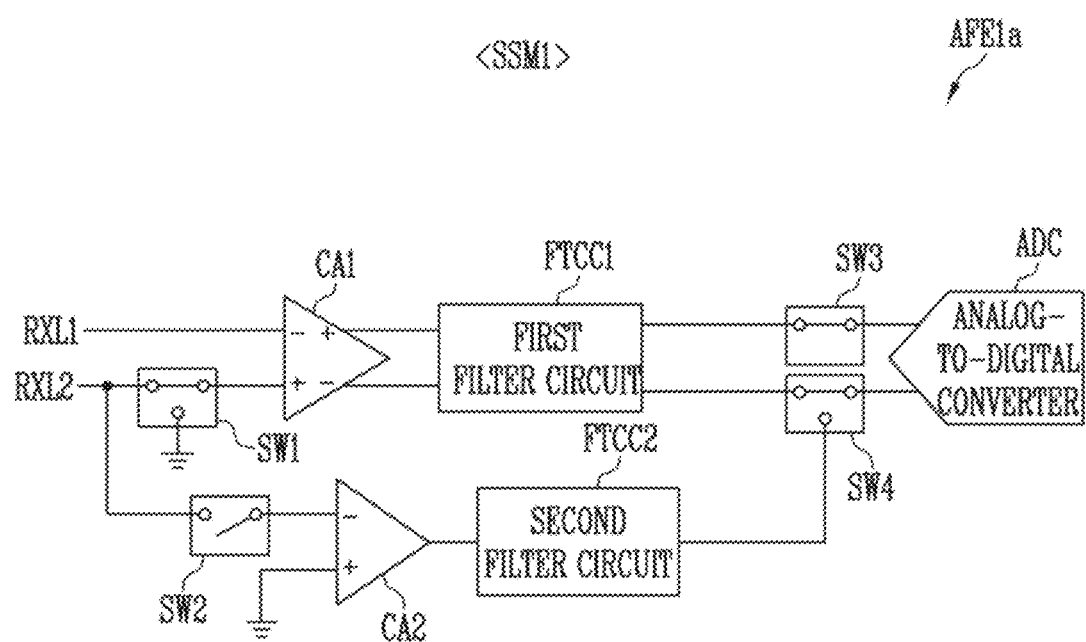
FIG. 6, FIG. 7 and FIG. 8 are drawings for explaining an analog front-end according to another embodiment of the present disclosure.
Figure 7:
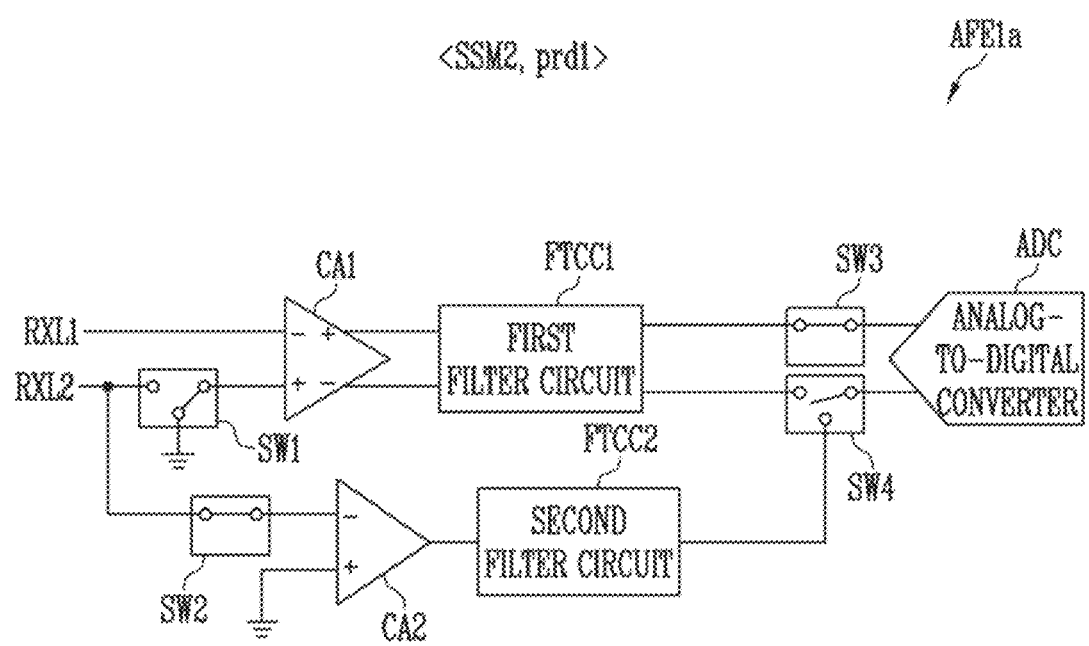
Figure 8:
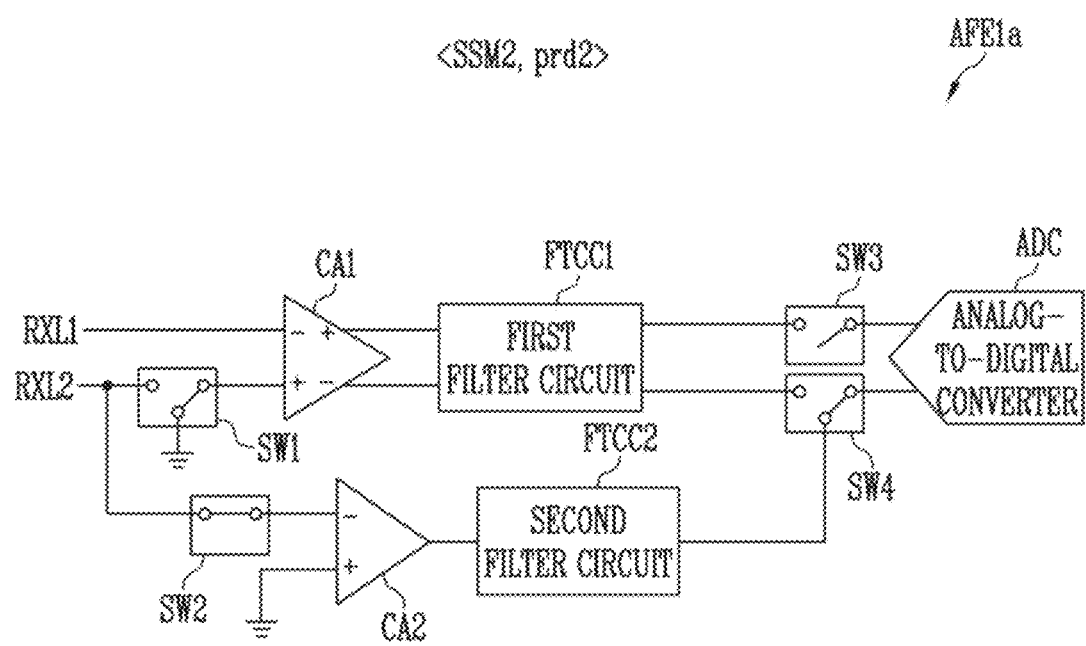

FIG. 6 to FIG. 8 are drawings for explaining an analog end according to another embodiment of the present disclosure.

FIG. 6 is a drawing for describing a case in which a first analog front-end AFE1a operates in a first sensing mode SSM1, and FIG. 7 and FIG. 8 are drawings for describing a case in which the first analog front-end AFE1a operates in a second sensing mode SSM2.

The first analog front-end AFE1a according to the embodiment of the present disclosure may include a first charge amplifier CA1, a second charge amplifier CA2, a first filter circuit FTCC1, a second filter circuit FTCC2, and an analog-to-digital converter ADC. According to the embodiment, the first analog front-end AFE1a may further include first to fourth switches SW1, SW2, SW3, and SW4. However, the number or connection configuration of the switches may be modified to replace the functions of the first to fourth switches SW1 to SW4.

The first analog front-end AFE1a may be connected to the (2-1)-th sensor RX1 and the (2-2)-th sensor RX2 of the second sensors RX1 to RX4 (see FIG. 4). The first analog front-end AFE1a may be connected to the (2-1)-th sensor RX1 through the (2-1)-th sensor line RXL1, and may be connected to the (2-2)-th sensor RX2 through the (2-2)-th sensor line RXL2.

The first charge amplifier CA1 may be a fully differential amplifier. A first input terminal (for example, an inverting input terminal) of the first charge amplifier CA1 may be connected to the (2-1)-th sensor RX1 through the (2-1)-th sensor line RXL1. A second input terminal (for example, a non-inverting input terminal) of the first charge amplifier CA1 may be connected to the first switch SW1.

The first switch SW1 may connect the second input terminal of the first charge amplifier CA1 to the (2-2)-th sensor line RXL2 or to a reference node (for example, a reference voltage or a ground voltage). For example, in the first sensing mode SSM1, the first switch SW1 may connect the second input terminal of the first charge amplifier CA1 to the (2-2)-th sensor line RXL2. In the second sensing mode SSM2, the first switch SW1 may connect the second input terminal of the first charge amplifier CA1 to the reference node.

The second charge amplifier CA2 may be a differential amplifier having a single-ended output. A first input terminal (for example, an inverting input terminal) of the second charge amplifier CA2 may be connected to the second switch SW2. The second switch SW2 may connect the first input terminal of the second charge amplifier CA2 to the (2-2)-th sensor line RXL2 or separate it from the (2-2)-th sensor line RXL2. For example, the separated first input terminal of the second charge amplifier CA2 may be left floating. A second input terminal (for example, a non-inverting input terminal) of the second charge amplifier CA2 may be connected to the reference node (for example, the reference voltage or the ground voltage).

Accordingly, in the first sensing mode SSM1, the (2-1)-th sensor RX1 and the (2-2)-th sensor RX2 may be connected to the first and second input terminals of the first charge amplifier CA1. In addition, in the second sensing mode SSM2, the (2-1)-th sensor RX1 may be connected to the first input terminal of the first charge amplifier CA1, and the (2-2)-th sensor RX2 may be connected to the first input terminal of the second charge amplifier CA2. In the second sensing mode SSM2, the second input terminal of the first charge amplifier CA1 may be connected to the reference node.

The first filter circuit FTCC1 may be connected to the output terminals of the first charge amplifier CA1. For example, the first filter circuit FTCC1 may have a differential path, and may be connected to the non-inverting output terminal and the inverting output terminal of the first charge amplifier CA1.

The second filter circuit FTCC2 may be connected to the output terminal of the second charge amplifier CA2. For example, the second filter circuit FTCC2 may have a single-ended path, and may be connected to the single-ended output terminal of the second charge amplifier CA2.

The first input terminal of the analog-to-digital converter ADC may be connected to the third switch SW3, and the second input terminal of the analog-to-digital converter ADC may be connected to the fourth switch SW4. The analog-to-digital converter ADC may be connected to the first and second output terminals of the first filter circuit FTCC1 through the third switch SW3 and the fourth switch SW4 in the first sensing mode SSM1. Accordingly, in the first sensing mode SSM1, the first analog front-end AFE1a may output the differential signal between the (2-1)-th sensing signal received from the (2-1)-th sensor RX1 and the (2-2)-th sensing signal received from the (2-2)-th sensor RX2 as a digital signal. The differential signal outputted in the first sensing mode SSM1 may be used to determine a touch position.

The analog-to-digital converter ADC may be alternately connected to the first output terminal of the first filter circuit FTCC1 and the output terminal of the second filter circuit in the second sensing mode SSM2. For example, during a first period prd1 of the second sensing mode SSM2, the third switch SW3 may connect the first output terminal of the first filter circuit FTCC1 to the first input terminal of the analog-to-digital converter ADC. During the first period prd1, the fourth switch SW4 may be in an open state. Thus, during the first period prd1, the analog-to-digital converter ADC may output the (2-1)-th sensing signal as a digital signal.

During a second period prd2 of the second sensing mode SSM2, the third switch SW3 may be in an open state. During the second period prd2, the fourth switch SW4 may connect the output terminal of the second filter circuit FTCC2 to the second input terminal of the analog-to-digital converter ADC. Thus, during the second period prd2, the analog-to-digital converter ADC may output the (2-2)-th sensing signal as a digital signal. Accordingly, in the second sensing mode SSM2, the first analog front-end AFE1a may time-divide each of the (2-1)-th sensing signal and the (2-2)-th sensing signal into a digital signal to output it.

The (2-1)-th sensing signal outputted in the second sensing mode SSM2 may be set as a base line of the (2-1)-th sensor RX1. The base line may be a value (a voltage value, a current value, or a digital value thereof) of the second sensing signal detected when no user input is present. When the difference between the second sensing signal detected during a user touch and the base line is greater than or equal to the threshold value, the user's touch may be confirmed. The (2-2)-th sensing signal outputted in the second sensing mode SSM2 may be set as a base line of the (2-2)-th sensor RX2.

Accordingly, in the present embodiment, the analog front-end may remove common noise in the first sensing mode SSM1, output a touch signal with a high signal to noise ratio (SNR), and update the base lines of the second sensors in the second sensing mode SSM2, thereby maintaining touch sensitivity.

Figure 9:
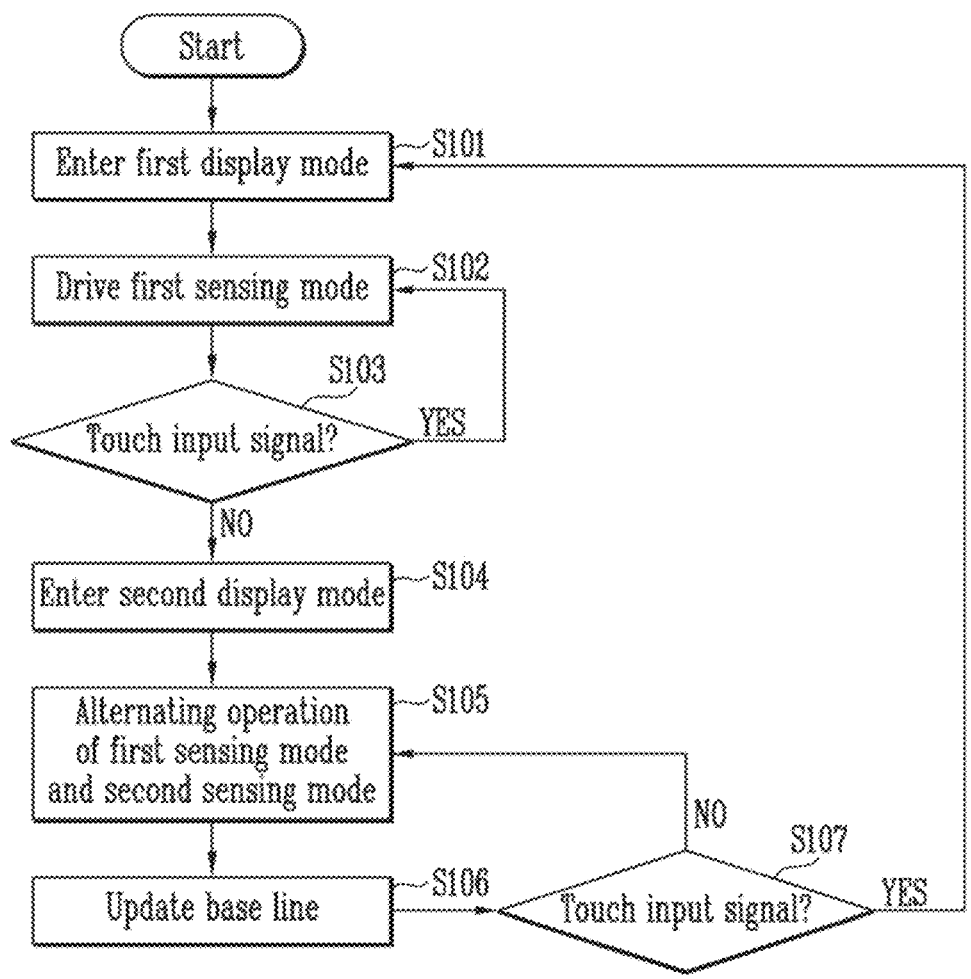
FIG. 9 illustrates a flowchart of a driving method based on a first display mode and a second display mode.
Figure 10:
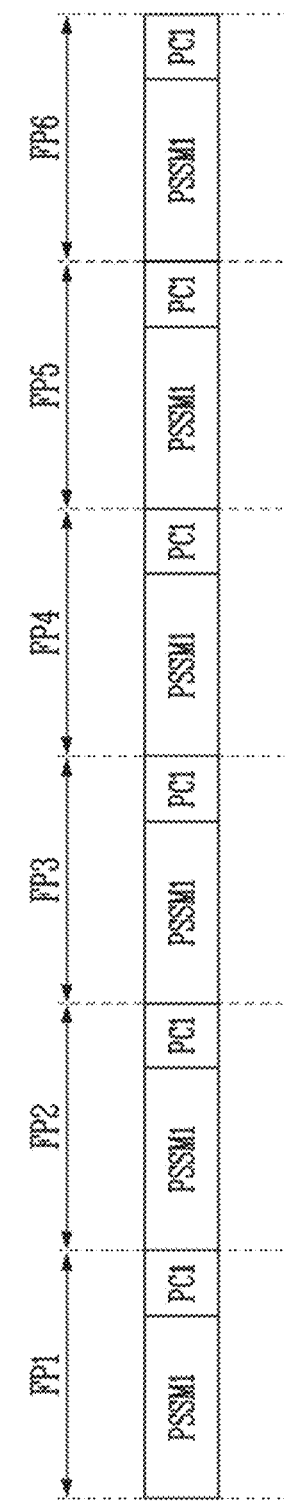
FIG. 10 is a drawing for explaining a first display mode according to an embodiment of the present disclosure.
Figure 11:
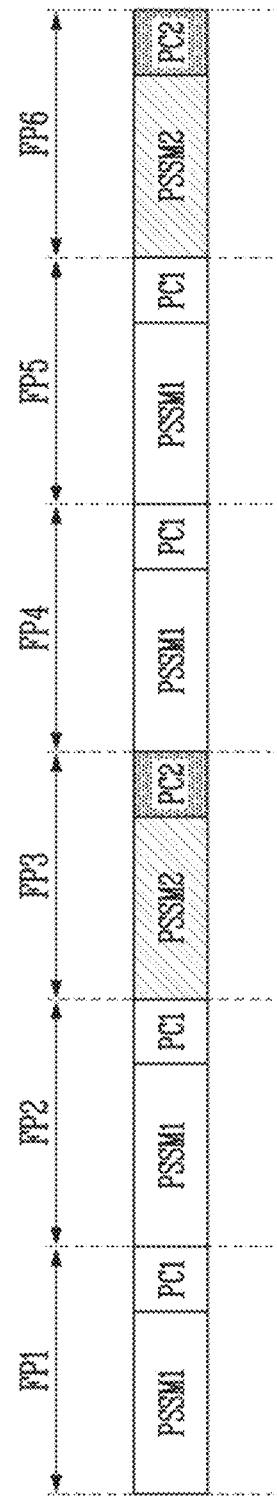
FIG. 11 is a drawing for explaining a second display mode according to an embodiment of the present disclosure.

FIG. 9 illustrates a flowchart of a driving method based on a first display mode and a second display mode. FIG. 10 is a drawing for explaining a first display mode according to an embodiment of the present disclosure. FIG. 11 is a drawing for explaining a second display mode according to an embodiment of the present disclosure.

First, it is assumed that a first display mode DPM1a is entered (S101). The first display mode DPM1a may be a normal display mode. The normal display mode may be a mode in which a display device displays an image. When the user is actively using the display device, or if a predetermined period has not elapsed since the last time use, the display device may operate in the first display mode DPM1a.

When the display device is in the first display mode DPM1a, the analog front-ends (AFE1, AFE2, AFE3, AFE4, . . . ) may be driven in the first sensing mode SSM1 (S102). Referring to FIG. 10, in the first display mode DPM1a, the frame periods (FP1, FP2, FP3, FP4, FP5, FP6, . . . ) may sequentially include a period PSSM1 and a period PC1, respectively. The period PSSM1 may be a period in which the analog front-ends (AFE1, AFE2, AFE3, AFE4, . . . ) are driven in the first sensing mode SSM1 to output digital signals that are differential signals. The period PC1 may be a period in which the signal processor DSP determines a touch position by processing digital signals. For example, when the display device operates in the first display mode DPM1a, the analog front-ends (AFE1, AFE2, AFE3, AFE4, . . . ) may operate only in the first sensing mode SSM1. In other words, the analog front-ends (AFE1, AFE2, AFE3, AFE4, . . . ) may not operate in the second sensing mode SSM2 in the first display mode DPM1a.

In the first display mode DPM1a, it may be determined whether a touch input signal is generated (S103). A touch input signal may be generated when the user touches the sensor portion 120. The touch input signal may refer to a second sensing signal where the difference from the baseline exceeds a threshold value. The touch input signal only needs to indicate whether a touch has occurred, and does not need to include information about the touch position. However, if the touch position is determined in the first sensing mode SSM1, and a touch input has been detected, the touch position result may also serve as a touch input signal. In addition, the touch input signal may be defined in various ways. If a touch input signal is generated within a certain period, the display device may continue to operate in the first display mode DMP1a, and the analog front-ends (AFE1, AFE2, AFE3, AFE4, . . . ) may be driven in the first sensing mode SSM1 (S102).

When the touch input signal is not generated for more than a certain period of time, the display device may enter a second display mode DPM2a (S104). The second display mode DPM2a may be an idle display mode. The idle display mode refers to a display mode where an image is displayed, but no user input has been detected for more than a certain period of time. For example, while a user is watching a movie without providing touch input, the display device may operate in the second display mode DPM2a.

When the display device is in the second display mode DPM2a, the analog front-ends (AFE1, AFE2, AFE3, AFE4, . . . ) may operate alternately in the first sensing mode SSM1 and the second sensing mode SSM2 (S105). Referring to FIG. 11, in the second display mode DPM2a, the first frame periods (FP1, FP2, FP4, FP5, . . . ) may sequentially include the period PSSM1 and the period PC1. In the second display mode DPM2a, the second frame periods (FP3, FP6, . . . ) may sequentially include a period PSSM2 and a period PC2. During the second display mode DPM2a, the number of the first frame periods (FP1, FP2, FP4, FP5, . . . ) may be greater than the number of the second frame periods (FP3, FP6, . . . ). For example, the number of the first frame periods (FP1, FP2, FP4, FP5, . . . ) may be twice the number of the second frame periods (FP3, FP6, . . . ).

As described above, the period PSSM1 may be a period in which the analog front-ends (AFE1, AFE2, AFE3, AFE4, . . . ) are driven in the first sensing mode SSM1 to output differential digital signals. The period PC1 refers to the time during which the signal processor DSP determines a touch position by processing the digital signals outputted during the period PSSM1.

The period PSSM2 refers to the time during which the analog front-ends (AFE1, AFE2, AFE3, AFE4, . . . ) are driven in the second sensing mode SSM2 to time-divide and output each of the second sensing signals from two adjacent second sensors as digital signals. The period PC2 refers to the time during which the signal processor DSP processes the digital signals outputted during the period PSSM2 to update the baseline for the two adjacent second sensors (S106).

In the second display mode DPM2a, it may be determined whether a touch input signal is generated (S107). If no touch input signal is detected for a certain period of time or longer, the display device may continue to operate in the second display mode DMP2a, and the analog front-ends (AFE1, AFE2, AFE3, AFE4, ...) may alternately operate in the first sensing mode SSM1 and the second sensing mode SSM2 (S105). However, if a touch input signal is detected within a certain period of time, the display device may switch to the first display mode DPM1a (S101).

At any step or point in time, the sequence shown in FIG. 9 may end when the display device is powered off or enters the standby mode.

Figure 12:
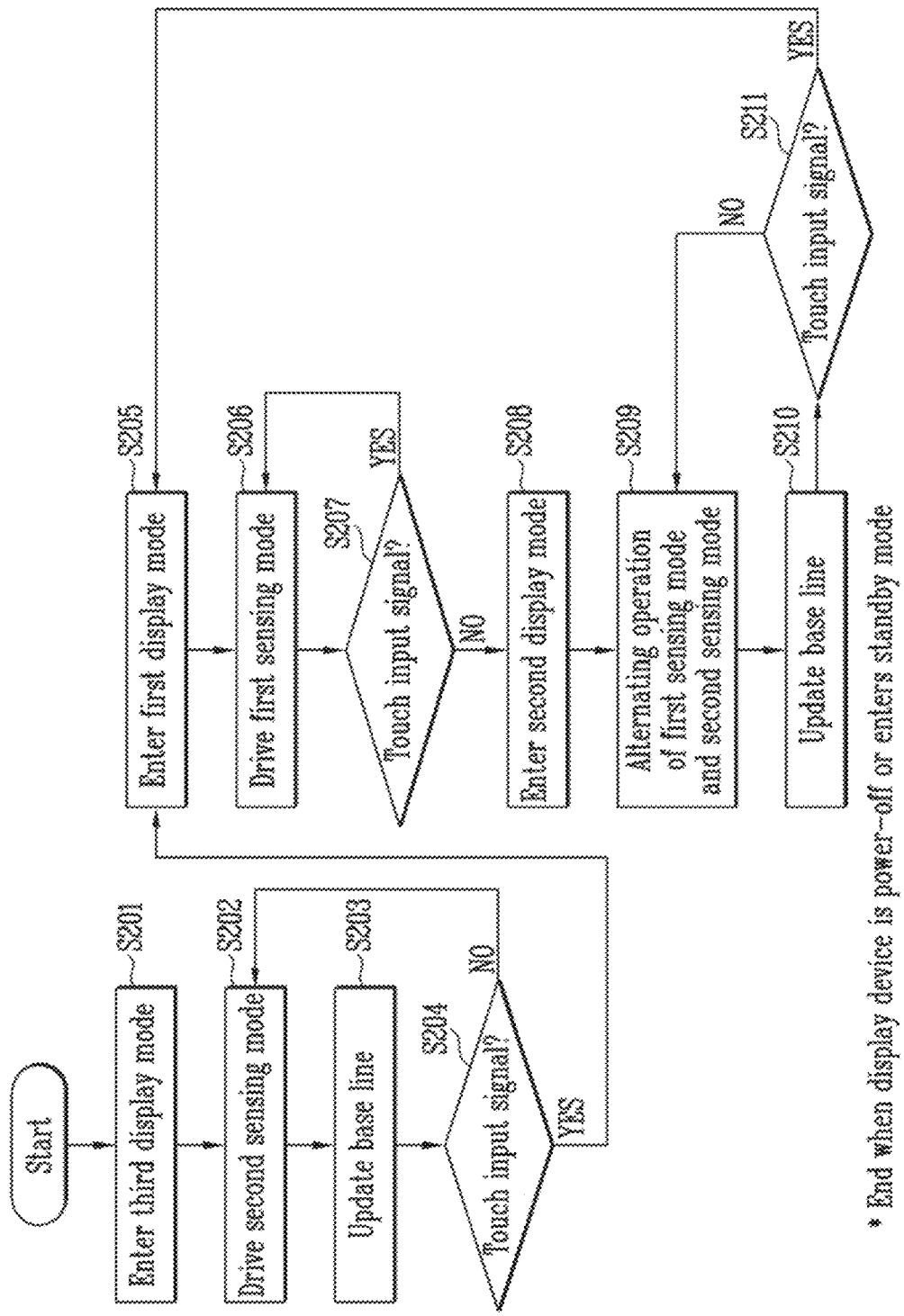
FIG. 12 illustrates a flowchart of a driving method based on a first display mode, a second display mode, and a third display mode.
Figure 13:
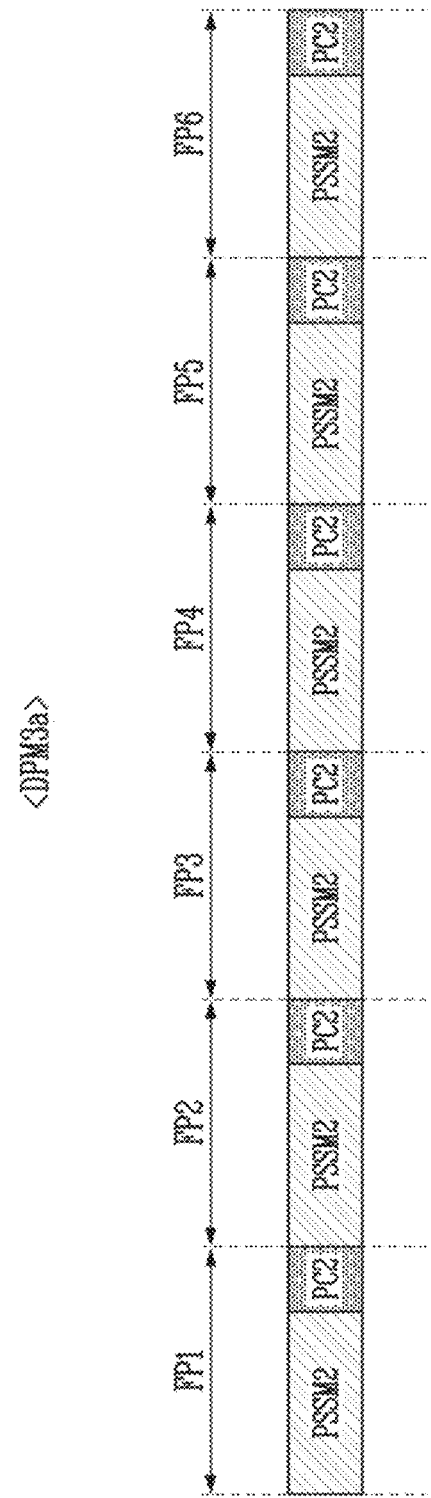
FIG. 13 is a drawing for explaining a third display mode according to an embodiment of the present disclosure.

FIG. 12 illustrates a flowchart of a driving method based on a first display mode, a second display mode, and a third display mode. FIG. 13 is a drawing for explaining a third display mode according to an embodiment of the present disclosure.

Referring to FIG. 12 and FIG. 13, the flowchart may further include steps S201, S202, S203, and S204 for a third display mode DPM3a.

First, it is assumed that the third display mode DPM3a is entered (S201). The third display mode DPM3a may be a low power display mode. The low power display mode may be a mode in which the display device does not display an image or displays only minimal information. For example, a standby mode, where the display device does not display an image, or an always on display (AOD) mode, where only minimal information such as time is displayed, may correspond to the low power display mode.

When the display device is in the third display mode DPM3a, the analog front-ends (AFE1, AFE2, AFE3, AFE4, ...) may be driven in the second sensing mode SSM2 (S202). Referring to FIG. 13, in the third display mode DPM3a, the frame periods (FP1, FP2, FP3, FP4, FP5, FP6, ...) may sequentially include a period PSSM2 and a period PC2, respectively.

As described above, the period PSSM2 may be a period in which the analog front-ends (AFE1, AFE2, AFE3, AFE4, ...) are driven in the second sensing mode SSM2 to time-divide and output each of the second sensing signals for two adjacent second sensors as digital signals. The period PC2 may be a period in which the signal processor DSP processes the digital signals outputted during the period PSSM2 to update the baseline for the two adjacent second sensors (S203).

For example, when the display device operates in the third display mode DPM3a, the analog front-ends (AFE1, AFE2, AFE3, AFE4, ...) may operate only in the second sensing mode SSM2. In other words, the analog front-ends (AFE1, AFE2, AFE3, AFE4, ...) may not operate in the first sensing mode SSM1 when the display device operates in the third display mode DPM3a.

In the third display mode DPM3a, it may be determined whether a touch input signal is generated (S204). For example, while updating the base lines for the second sensors, a second sensing signal that deviates from the base line value may be detected. For example, a second sensing signal with a difference greater than or equal to a threshold value may be detected when compared to a baseline at a previous time point or to a base line of an adjacent second sensor. This situation may be defined the occurrence of a touch input signal. The touch input signal only needs to indicate whether a user has touched the device, without requiring information about the touch position. In addition to this, the touch input signal may be defined in various ways.

When the touch input signal does not occur for a certain period of time or longer, the display device may continue to operate in the third display mode DMP3a, and the analog front-ends (AFE1, AFE2, AFE3, AFE4, ...) may operate in the second sensing mode SSM2 (S202). When the touch input signal occurs within a certain period of time, the display device may enter first display mode DPM1a (S205).

Steps S205, S206, S207, S208, S209, S210, and S211 of FIG. 12 are the same as steps S101, S102, S103, S104, S105, S106, and S107 of FIG. 9, respectively, and duplicate descriptions thereof will be omitted.

At any step or point in time, the sequence of FIG. 12 may end when the display device is powered off or the display device enters the standby mode.

Figure 14:
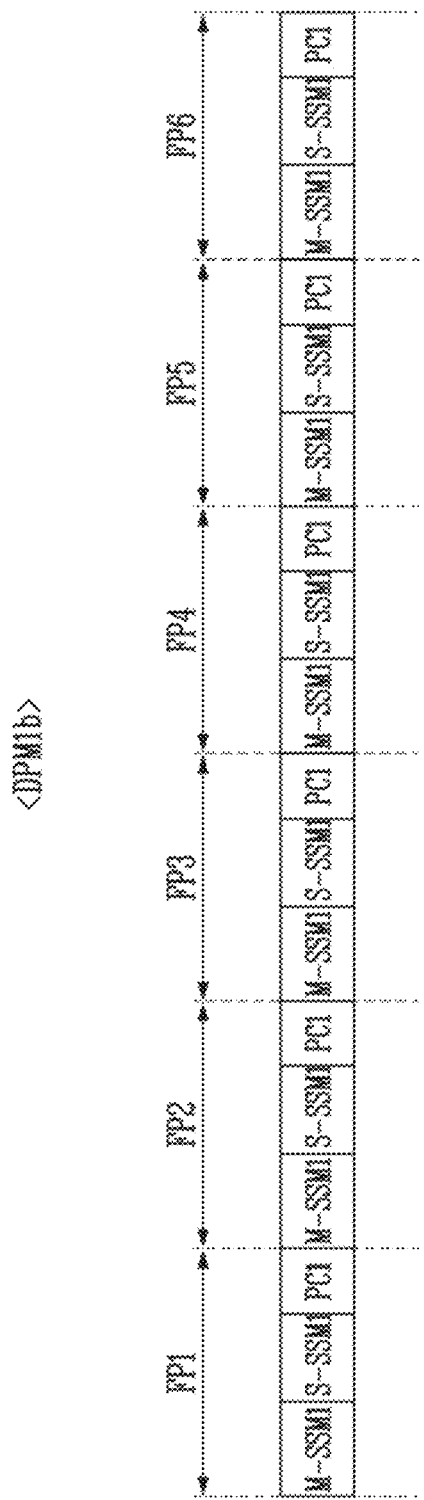
FIG. 14, FIG. 15 and FIG. 16 are drawings for explaining a first display mode, a second display mode, and a third display mode according to another embodiment of the present disclosure.
Figure 15:
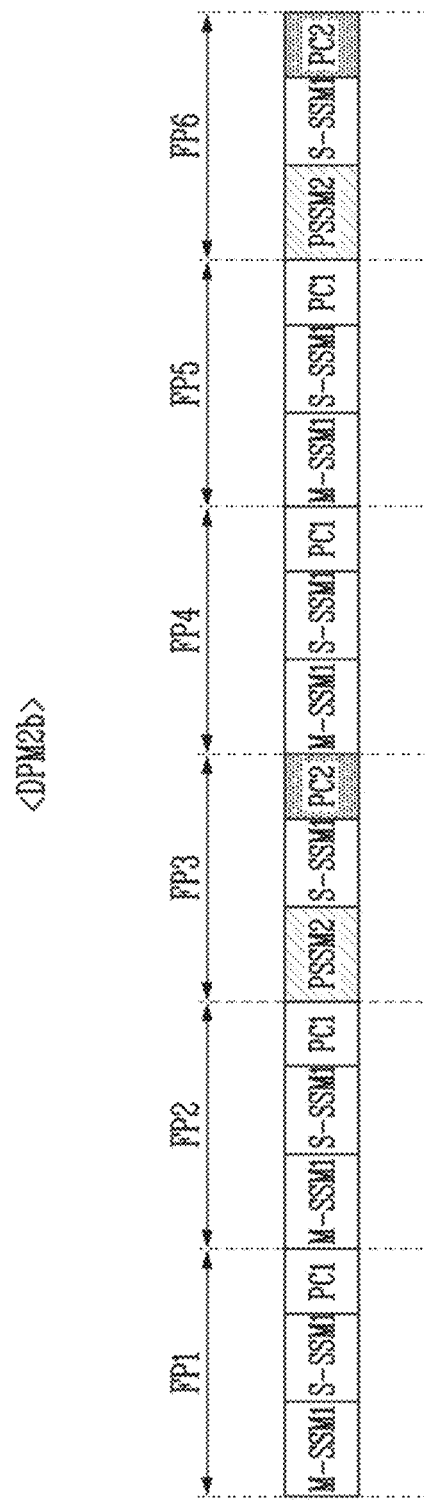
Figure 16:
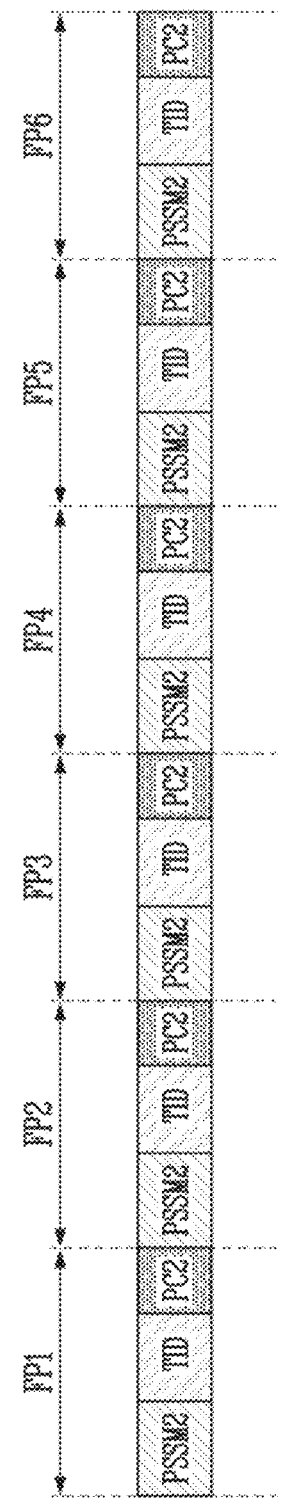

FIG. 14 to FIG. 16 are drawings for explaining a first display mode, a second display mode, and a third display mode according to another embodiment of the present disclosure.

Referring to FIG. 14, in the first display mode DPM1b, respective frame periods FP1 to FP6 may sequentially include a period M-SSM1, a period S-SSM1, and a period PC1. The period M-SSM1 may be the same as the period PSSM1 of FIG. 10, and may be a period of generating digital signals for detecting a touch position in a mutual capacitance method. The period S-SSM1 may be a period of generating digital signals for detecting a touch position in a self-capacitance method. For example, the analog front-ends AFE1 to AFE4 may generate digital signals for the self-capacitances of the first sensors TX and the self-capacitances of the second sensors RX during the period S-SSM1.

The period PC1 may be a period in which the signal processor DSP determines a touch position by processing digital signals. In this case, during the period PC1, the signal processor DSP may use the digital signals received during the period M-SSM1 to determine the touch position in a mutual capacitance method, and may use the digital signals received during the period S-SSM1 to determine the touch position in a self-capacitance method.

For example, consider a scenario where a water droplet falls on a partial area of the sensing portion 120, while a user's touch occurs in another area. The mutual capacitance method may precisely sense the position of the water droplet and the touch position, but it may not be able to distinguish between the two. To address this, an additional period S-SSM1 driven by the self-capacitance method may be provided. In the self-capacitance method, the position of the water droplet may not be sensed. By combining the mutual capacitance and self-capacitance methods, the user's exact touch position may be calculated by excluding the sensing results caused by the water droplet. In addition, the mutual capacitance and self-capacitance methods may be used together for other complementary purposes.

Referring to FIG. 15, in the second display mode DPM2b, the first frame periods (FP1, FP2, FP4, FP5, ...) may sequentially include the period M-SSM1, the period S-SSM1, and the period PC1. The operations of the analog front-ends AFE1 to AFE4 and the signal processor DSP during the first frame periods (FP1, FP2, FP4, FP5, ...) are the same as those described with reference to FIG. 14.

In the second display mode DPM2b, the second frame periods (FP3, FP6, ...) may sequentially include a period PSSM2, a period S-SSM1, and a period PC2. The operations of the analog front-ends AFE1 to AFE4 and the signal processor DSP during the period PSSM2 and the period PC2 are the same as those described with reference to FIG. 11. The operations of the analog front-ends AFE1 to AFE4 during the period S-SSM1 are the same as those described with reference to FIG. 14. In some embodiments, during the period PC2, the signal processor DSP may detect the touch position or whether the touch is performed using a self-capacitance method based on the digital signals outputted during the period S-SSM1.

Referring to FIG. 16, in the third display mode DPM3b, respective frame periods FP1 to FP6 may sequentially include a period PSSM2, a period TID, and a period PC2. The operations of the analog front-ends AFE1 to AFE4 and the signal processor DSP during the period PSSM2 and the period PC2 are the same as those described with reference to FIG. 11. The period TID may be a period for determining the presence or absence of a touch input. For example, during the period TID, the analog front-ends AFE1 to AFE4 may generate digital signals for the self-capacitances of the first sensors TX and the self-capacitances of the second sensors RX. In this case, the period TID may be configured to be the same as the period S-SSM1. However, since it is not necessary to determine the touch position during the period TID, digital signals for the self-capacitances of the first sensors TX may be generated, while digital signals for the self-capacitances of the second sensors RX may not be generated. As another example, during the period TID, digital signals for the self-capacitances of the second sensors RX may be generated, while digital signals for the self-capacitances of the first sensors TX may not be generated.

The flowcharts of FIG. 9 and FIG. 12 may also be equally applied to the first to third display modes DPM1b, DPM2b, and DPM3b of FIG. 14 to FIG. 16.

FIG. 17 to FIG. 23 are drawings for explaining an exemplary configuration of a display device. Reference numerals of FIG. 17 to FIG. 23 and the reference numerals of FIG. 1 to FIG. 16 are independent of each other.

Figure 17:
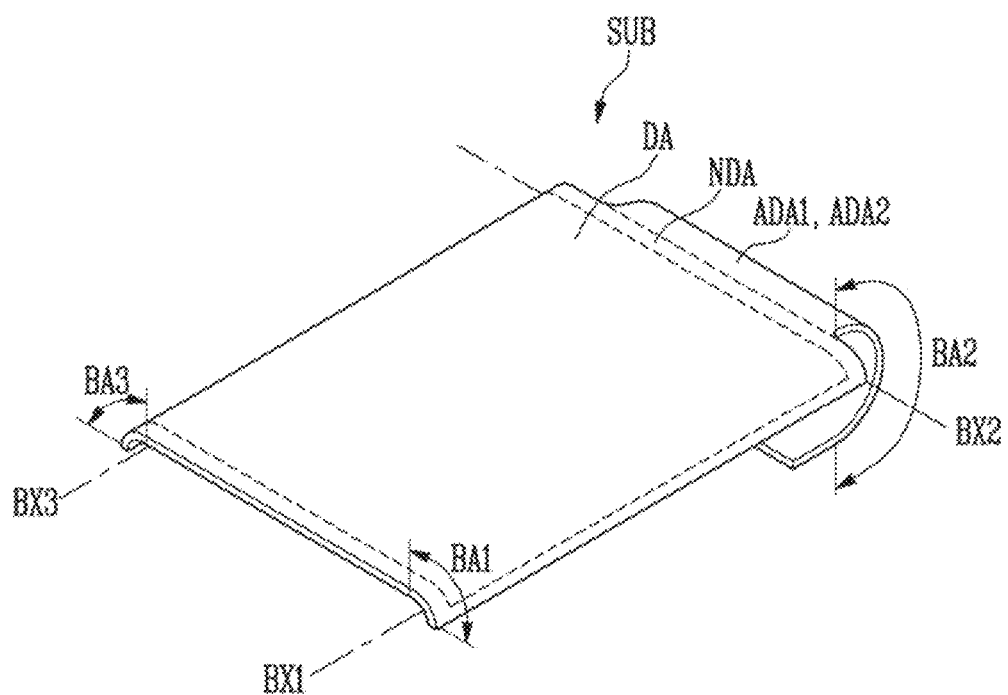
FIG. 17, FIG. 18, FIG. 19, FIG. 20, FIG. 21, FIG. 22 and FIG. 23 are drawings for explaining an example configuration of a display device.
Figure 18:
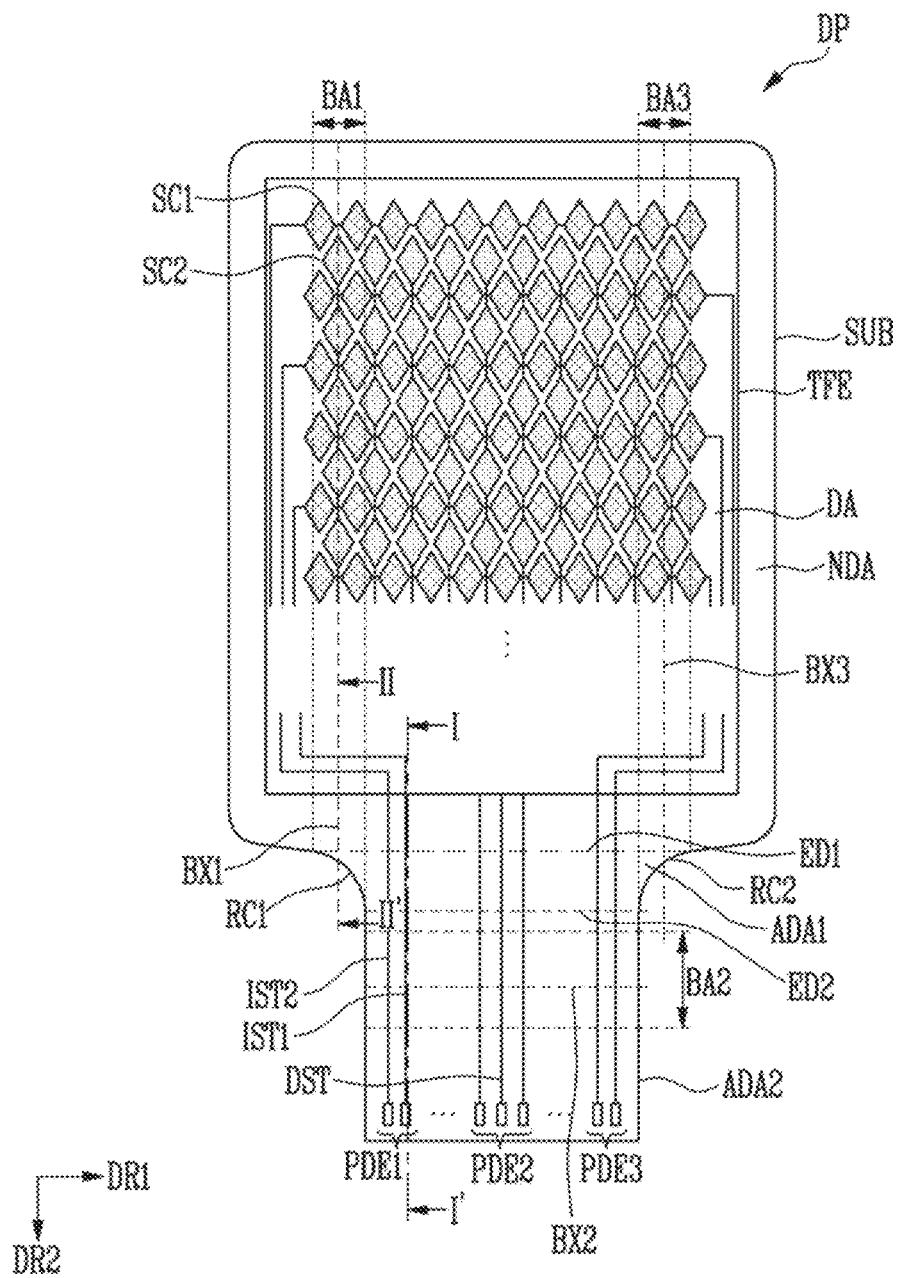

FIG. 17 is a drawing for explaining a substrate according to an embodiment, and FIG. 18 is a drawing for explaining a display device according to an embodiment.

In the following embodiments, a position of a plane may be defined by the first direction DR1 and the second direction DR2, and a position of a height may by defined by the third direction DR3 (see FIG. 19). The first direction DR1, the second direction DR2, and third direction DR3 may be directions orthogonal to each other.

A substrate SUB may include a display area DA, a non-display area NDA, a first additional area ADA1, and a second additional area ADA2.

The display area DA may have a rectangular shape. Each corner of the display area DA may have an angled shape or a curved shape. In addition, in a circular display, the display area DA may have a circular shape. In addition, the display area DA may have a polygonal shape other than a quadrangular shape and an elliptical shape. As such, the shape of the display area DA may be differently set depending on a product.

Pixels may be disposed on the display area DA. Depending on a type of the display device DP, respective pixels may include a light emitting diode or a liquid crystal layer.

The non-display area NDA may surround a periphery of the display area DA. For example, the non-display area NDA may have a rectangular shape. Each corner of the non-display area NDA may have an angled shape or a curved shape. FIG. 14 illustrates a case in which each corner of the non-display area NDA has a curved shape. The non-display area NDA may have a circular shape. Since it is advantageous to minimize the non-display area NDA in a narrow bezel structure, a shape of the non-display area NDA may be similar to that of the display area DA.

The first additional area ADA1 may be disposed between the non-display area NDA and the second additional area ADA2. The first additional area ADA1 may be connected to the non-display area NDA at a first boundary ED1. The first additional area ADA1 may be connected to the second additional area ADA2 at a second boundary ED2. The first boundary ED1 and the second boundary ED2 may extend in the first direction DR1, respectively.

A width of the first additional area ADA1 may become narrower from the first boundary ED1 to the second boundary ED2. In other words, the width of the first additional area ADA1 in the first direction DR1 may become narrower toward the second direction DR2. Accordingly, the first additional area ADA1 may include curved first and second lateral surfaces RC1 and RC2. The first and second lateral surfaces RC1 and RC2 may be convex toward the inside of the substrate SUB (for example, a center of the substrate SUB).

In FIG. 18, the first additional area ADA1 is illustrated to include two lateral surfaces RC1 and RC2 in the first direction DR1 and an opposite direction thereof. In another embodiment, the first additional area ADA1 may include only the first lateral surface RC1, as the boundary in the first direction DR1 aligns with the boundary of the non-display area NDA. In another embodiment, the first additional area ADA1 may include only the second lateral surface RC2, as the boundary in the direction opposite to the first direction DR1 aligns with the boundary of the non-display area NDA.

The second additional area ADA2 may have a rectangular shape. Each corner positioned in the second direction DR2 of the second additional area ADA2 may have an angled shape or a curved shape.

An encapsulation film TFE may be disposed on the pixels. For example, the encapsulation film TFE may cover the pixels in the display area DA, and a boundary of the encapsulation film TFE may be disposed in the non-display area NDA. The encapsulation film TFE covers the light emitting elements and the circuit elements of the pixels of the display area DA, thereby preventing damage from external moisture or impact.

Sensing electrodes SC1 and SC2 may be disposed on the encapsulation film TFE. The sensing electrodes SC1 and SC2 may detect a touch, hovering, gesture, proximity, or the like by the user's body. The sensing electrodes SC1 and SC2 may be configured in different shapes according to various methods such as a resistive type, a capacitive type, an electromagnetic induction type (EMI), an electromagnetic resonance type (EMR), and an optical type. For example, when the sensing electrodes SC1 and SC2 are configured as a capacitive type, the sensing electrodes SC1 and SC2 may be configured as a self-capacitive type or a mutual-capacitive type. Hereinafter, for better understanding and ease of description, a case in which the sensing electrodes SC1 and SC2 are configured as a mutual-capacitive type will be described as an example.

When the sensing electrodes SC1 and SC2 are configured as a mutual capacitive type, a driving signal is transmitted through a sensing wire corresponding to the first sensing electrode SC1, and a sensing signal may be received through a sensing wire corresponding to the second sensing electrode SC2 forming mutual capacitance with the first sensing electrode SC1. When the user's body approaches, the mutual capacitance between the first sensing electrode SC1 and the second sensing electrode SC2 may change. Based on the difference between the sensing signals, it can be determined whether the user's touch has occurred. In another embodiment, a driving signal is transmitted through a sensing wire corresponding to the second sensing electrode SC2, and a sensing signal may be received through a sensing wire corresponding to the first sensing electrode SC1 forming mutual capacitance with the second sensing electrode SC2.

Pads PDE1, PDE2, and PDE3 may be disposed on the second additional area ADA2. The pads PDE1 and PDE3 may be connected to the sensing electrodes SC1 and SC2 disposed on the encapsulation film through sensing wires IST1 and IST2. The pads PDE1 and PDE3 may be connected to an external touch integrated chip (IC). In addition, the pads PDE2 may be connected to pixels or a driver of the pixels disposed under the encapsulation film TFE through display wires DST. The driver may include a scan driver, a light emission driver, a data driver, and the like. The driver may be disposed under the encapsulation film TFE, or may be disposed on an external display IC connected to through the pads PDE2.

When the display device DP is a mutual capacitance type, the touch IC may transmit a driving signal through the first sensing wire IST1, and may receive a sensing signal through the second sensing wire IST2. In another embodiment, the driving signal may be transmitted through the second sensing wire IST2, and the sensing signal may be received through the first sensing wire IST1. For reference, when the display device DP operates using the self-capacitance method, there may be no difference in the driving methods of the first sensing wire IST1 and the second sensing wire IST2. The display wires DST may include a control line, a data line, a power line, etc., and may provide signals so that the pixels may display an image. These signals may be provided from a driver connected to the display wires DL.

FIG. 17 illustrates a state in which the substrate SUB is bent, and FIG. 18 illustrates a state in which the substrate SUB is not bent. The display device DP may be bent as shown in FIG. 17 after elements are stacked on the substrate SUB in a state that is not bent as shown in FIG. 18.

The substrate SUB may include a first bending area BA1 extending from the first lateral surface RC1 of the first additional area ADA1 to overlap the non-display area NDA. Additionally, the first bending area BA1 may extend to overlap the display area DA. In other words, each of the display area DA, the non-display area NDA, and the first additional area ADA1 may partially overlap the first bending area BA1. The first bending area BA1 may have a width in the first direction DR1, and may extend lengthwise in the second direction DR2. A first bending axis BX1 may be a folding line extending from a center of the first bending area BA1 in the second direction DR2. In some embodiments, the first bending area BA1 may be a portion where stress is reduced by removing part of the insulating film, in contrast to the surrounding areas. In some embodiments, the first bending area BA1 may have the same configuration as other portions around it.

The substrate SUB may include a third bending area BA3 extending from the second lateral surface RC2 of the first additional area ADA1 to overlap the non-display area NDA. Additionally, the second bending area BA3 may extend to overlap the display area DA. In other words, each of the display area DA, the non-display area NDA, and the first additional area ADA1 may partially overlap the third bending area BA3. The third bending area BA3 may have a width in the first direction DR1, and may extend lengthwise in the second direction DR2. A third bending axis BX3 may be a folding line extending from a center of the third bending area BA3 in the second direction DR2. In some embodiments, the third bending area BA3 may be a portion where stress is reduced by removing part of the insulating film, in contrast to the surrounding areas. In some embodiments, the third bending area BA3 may have the same configuration as other portions around it.

The second additional area ADA2 may include a second bending area BA2. The second bending area BA2 may have a width in the second direction DR2, and may extend lengthwise in the first direction DR2. A second bending axis BX2 may be a folding line extending from a center of the second bending area BA2 in the first direction DR1. In some embodiments, the second bending area BA2 may be a portion where stress is reduced by removing part of the insulating, in contrast to the surrounding areas. In some embodiments, the second bending area BA2 may have the same configuration as other portions around it.

The first to third bending areas BA1, BA2, and BA3 may not overlap each other.

Herein, the term "folded" means that a shape is not fixed, but an original shape may be changed to another shape, and the shape is folded, curved, or rolled along one or more bending axes. By the first and third bending areas BA1 and BA3, the side bezel width of the opposite direction of the first direction DR1 of the display device DP and a width of the side bezel of the first direction DR1 may be reduced. In addition, a width of the side bezel of the second direction DR2 of the display device DP may be reduced by the second bending area BA2.

Figure 19:
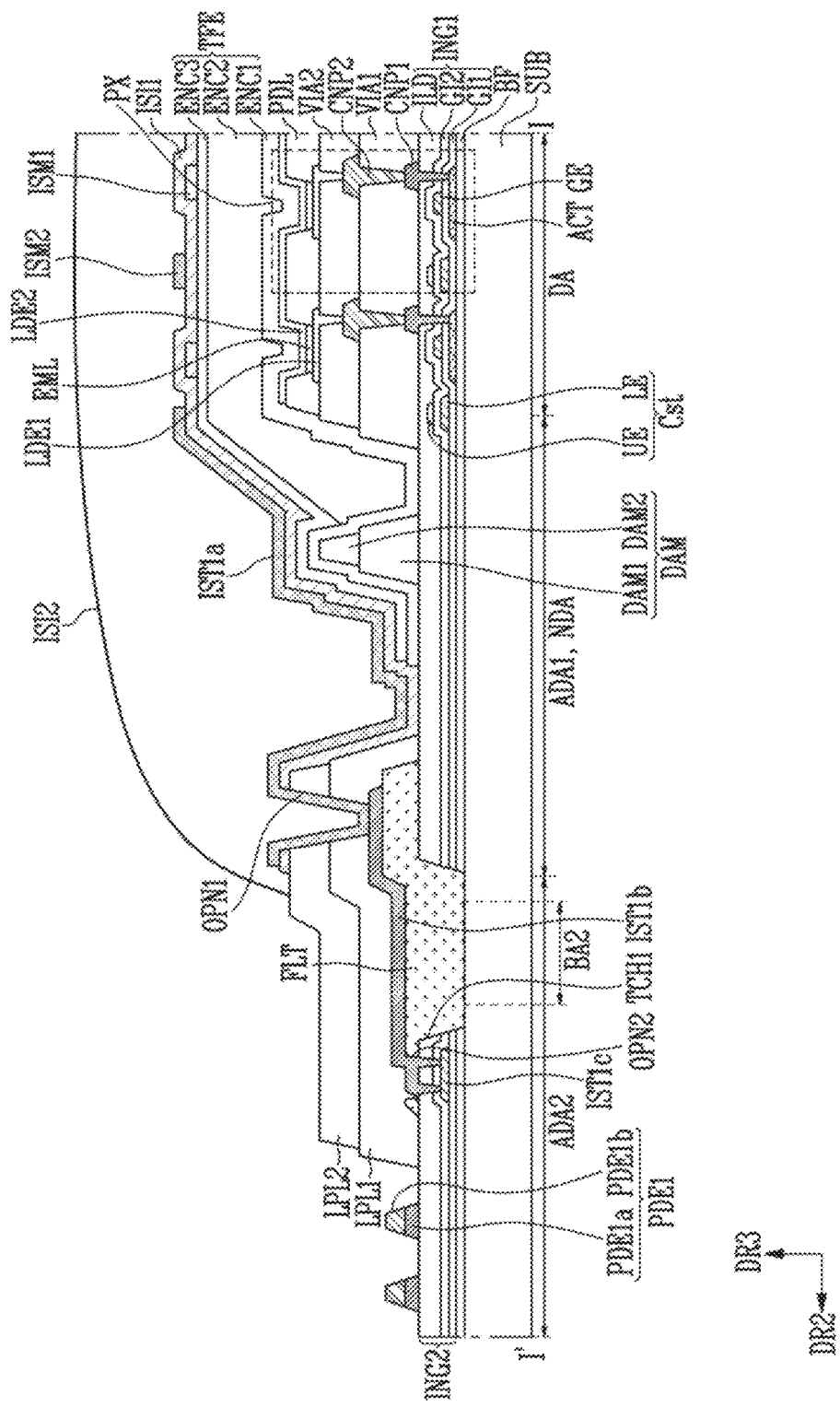

FIG. 19 is a cross-sectional view taken along line I-I' of FIG. 18. It is assumed that line I-I' in FIG. 18 passes through the first pad PDE1 and the first sensing wire IST1.

First, the display area DA will be described. In the embodiment, pixels PX are provided in the display area DA. Each pixel PX may include a transistor connected to a corresponding wire among the display wires DST, a light emitting element connected to the transistor, and a capacitor Cst. In FIG. 19, for better understanding and ease of description, one transistor, one light emitting element, and one capacitor Cst are illustrated as an example for one pixel PX.

The substrate SUB may be made of an insulating material such as glass or a resin. In addition, the substrate SUB may be made of a flexible material to be bendable or foldable, and may have a single-layered structure or a multi-layered structure.

For example, the substrate SUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material included in the substrate SUB may be variously changed, and may also include fiber reinforced plastic (FRP).

For example, when the substrate SUB has a multi-layered structure, inorganic materials such as a silicon nitride, a silicon oxide, and a silicon oxynitride may be interposed between a plurality of layers in a single layer or in a plurality of layers.

A buffer film BF may cover the substrate SUB. The buffer film BF may prevent impurities from diffusing into a channel of the transistor. The buffer film BF may be an inorganic insulating film made of an inorganic material. For example, the buffer film BF may be made of a silicon nitride, a silicon oxide, a silicon oxynitride, or the like, and may be omitted depending on the materials and the process conditions of the substrate SUB. In some embodiments, a barrier layer may be further provided.

An active film ACT may be disposed on the buffer film BE. The active film ACT may be patterned to form a channel, a source electrode, and a drain electrode of the transistor, or to form a wire. The active film ACT may be made of a semiconductor material. The active film ACT may be a semiconductor pattern made of polysilicon, amorphous silicon, or an oxide semiconductor. The channel of the transistor is a semiconductor pattern that is not doped with an impurity, and may be an intrinsic semiconductor. The source electrode, the drain electrode, and the wire may be a semiconductor pattern doped with an impurity. An N-type impurity, a P-type impurity, and other impurities such as metal may be used as the impurity.

A first gate insulating film GI1 may cover the active film ACT. The first gate insulating film GI1 may be an inorganic insulating film made of an inorganic material. As the inorganic material, an inorganic insulating material such as polysiloxane, a silicon nitride, a silicon oxide, or a silicon oxynitride may be used.

A gate electrode GE of the transistor and a lower electrode LE of the capacitor Cst may be disposed on the first gate insulating layer GI1. The gate electrode GE may overlap an area corresponding to the channel.

The gate electrode GE and the lower electrode LE may be made of metal. For example, the gate electrode GE may be made of at least one of metals such as gold (Au), silver (Ag), aluminum (Al), molybdenum (Mo), chromium (Cr), titanium (Ti), nickel (Ni), neodymium (Nd), and copper (Cu), or an alloy thereof. In addition, the gate electrode GE may be formed as a single film, but is not limited thereto, and may be formed as a multi-film in which two or more materials among metals and alloys are stacked.

A second gate insulating film GI2 may cover the gate electrode GE and the lower electrode LE. The second gate insulating film GI2 may be an inorganic insulating film made of an inorganic material. As the inorganic material, polysiloxane, a silicon nitride, a silicon oxide, and a silicon oxynitride may be used.

An upper electrode UE of the capacitor Cst may be disposed on the second gate insulating film GI2. The upper electrode UE of the capacitor Cst may be made of metal. For example, the upper electrode UE may be made of at least one of metals such as gold (Au), silver (Ag), aluminum (Al), molybdenum (Mo), chromium (Cr), titanium (Ti), nickel (Ni), neodymium (Nd), and copper (Cu), or an alloy thereof. In addition, the upper electrode UE may be formed as a single film, but is not limited thereto, and may be formed as a multi-film in which two or more materials among metals and alloys are stacked.

The lower electrode LE and the upper electrode UE may configure the capacitor Cst with the second gate insulating film GI2 interposed therebetween. In FIG. 19, the capacitor Cst is shown to have a two-layered electrode structure of the lower electrode LE and the upper electrode UE, but in another embodiment, the capacitor Cst may have a three-layered electrode structure by using the active layer ACT, or may have a three-layer electrode structure or a four or more layered structure by using an electrode of the same layer as a first connection pattern CNP1.

An interlayer insulating film ILD may cover the upper electrode UE. The interlayer insulating film ILD may be an inorganic insulating film made of an inorganic material. As the inorganic material, polysiloxane, a silicon nitride, a silicon oxide, and a silicon oxynitride may be used.

For better understanding and ease of description in the present embodiment, the first gate insulating film GI1, the second gate insulating film GI2, and the interlayer insulating film ILD may be referred to as a first insulating film group ING1. The first insulating film group ING1 may cover a portion of the transistor. In some embodiments, the first insulating film group ING1 may further include the buffer film BF.

The first connection pattern CNP1 may be disposed on the interlayer insulating film ILD. The first connection pattern CNP1 may contact a source electrode and a drain electrode formed by the active film ACT through contact holes formed in the interlayer insulating film ILD, the second gate insulating film GI2, and the first gate insulating film GI1, respectively.

The first connection pattern CNP1 may be made of metal. For example, the first connection pattern CNP1 may be made of at least one of metals such as gold (Au), silver (Ag), aluminum (Al), molybdenum (Mo), chromium (Cr), titanium (Ti), nickel (Ni), neodymium (Nd), and copper (Cu), or an alloy thereof.

In some embodiments, the passivation film may cover the first connection pattern CNP1. The passivation film may be an inorganic insulating film made of an inorganic material. As the inorganic material, polysiloxane, a silicon nitride, a silicon oxide, and a silicon oxynitride may be used.

A first via film VIA1 may cover the passivation film or the transistor. The first via film VIA1 may be an organic insulating film made of an organic material. As the organic material, an organic insulating material such as a polyacrylic compound, a polyimide compound, a fluorine-based carbon compound such as Teflon, a benzocyclobutene compound, and the like may be used. The organic film may be deposited by a method such as evaporation.

A second connection pattern CNP2 may be connected to the first connection pattern CNP1 through the opening of the first via film VIA1. The second connection pattern CNP2 may be made of at least one of metals such as gold (Au), silver (Ag), aluminum (Al), molybdenum (Mo), chromium (Cr), titanium (Ti), nickel (Ni), neodymium (Nd), and copper (Cu), or an alloy thereof.

A second via film VIA2 may cover the first via film VIA1 and the second connection pattern CNP2. The second via film VIA2 may be an organic insulating film made of an organic material. As the organic material, an organic insulating material such as a polyacrylic compound, a polyimide compound, a fluorine-based carbon compound such as Teflon, a benzocyclobutene compound, and the like may be used.

A first light emitting element electrode LDE1 may be connected to the second connection pattern CNP2 through the opening of the second via film VIA2. Here, the first light emitting element electrode LDE1 may be an anode of the light emitting element in some embodiments.

In some embodiments, the configuration of the second via film VIA2 and the second connection pattern CNP2 may be omitted, and the first light emitting element electrode LDE1 may be directly connected to the first contact electrode CNP1 through the opening of the first via film VIA1.

The first light emitting element electrode LDE1 may be made of a metal film such as Ag, Mg, Al, Pt, Pd, Au, Ni, Nd, Ir, Cr, and an alloy thereof and/or an indium tin oxide (ITO), an indium zinc oxide (IZO), a zinc oxide (ZnO), and indium tin zinc oxide (ITZO). The first light emitting element electrode LDE1 may be made of one type of metal, but is not limited thereto, and may be made of two or more types of metals, for example, an alloy of Ag and Mg.

The first light emitting element electrode LDE1 may be formed of a transparent conductive film when an image is to be provided in a lower direction of the substrate SUB, and it may be formed of a metal reflective film and/or a transparent conductive film when an image is to be provided in an upper direction of the substrate SUB.

A pixel defining film PDL partitioning a light emitting area of each pixel PX is provided on the substrate SUB on which the first light emitting element electrode LDE1 is formed. The pixel defining film PDL may be an organic insulation layer made of an organic material. As the organic material, an organic insulating material such as a polyacrylic compound, a polyimide compound, a fluorine-based carbon compound such as Teflon, a benzocyclobutene compound, and the like may be used.

The pixel defining film PDL may expose an upper surface of the first light emitting element electrode LDE1, and may protrude from the substrate SUB along a circumference of the pixel PX. A light emitting film EML may be provided in an area of the pixel PX surrounded by the pixel defining film PDL.

The light emitting film EML may include a low-molecular or high-molecular material. The low-molecular material may include a copper phthalocyanine (CuPc), (N,N'-Di(naphthalene-1-yl)-N,N'-diphenyl-benzidine: NPB), (tris-8-hydroxyquinoline aluminum)(Alq3), and the like. These materials may be formed by a method of vacuum deposition. The high-molecular material may include PEDOT, a polyphenylenevinylene (PPV)-based material, and a polyfluorene-based material.

The light emitting film EML may be provided as a single layer, or may be provided as a multilayer including various functional layers. When the light emitting film EML is provided as a multilayer, it may have a structure in which a hole injection layer (HIL), a hole transport layer (HTL), an emission layer (EML), an electron transport layer (ETL), an electron injection layer (EIL) are stacked in a single or complex structure. Such an emission film EML may be formed by a screen printing method, an inkjet printing method, or a laser induced thermal imaging method (LITI).

In some embodiments, at least a portion of the emission film EML may be integrally formed on a plurality of first light emitting element electrodes LDE1, and it may be individually provided to correspond to each of the plurality of first light emitting element electrodes LDE1.

A second light emitting element electrode LDE2 may be provided on the emission film EML. The second light emitting element electrode LDE2 may be provided for each pixel PX, but may be provided to cover most of the display area DA, and may be shared by a plurality of pixels PX.

In some embodiments, the second light emitting element electrode LDE2 may be used as a cathode or an anode, and when the first light emitting element electrode LDE1 is an anode, the second light emitting element electrode LDE2 may be used as a cathode, and when the first light emitting element electrode LDE1 is a cathode, the second light emitting element electrode LDE2 may be used as an anode.

The second light emitting element electrode LDE1 may be formed of a metal film such as Ag, Mg, Al, Pt, Pd, Au, Ni, Nd, Ir, Cr, and/or a transparent conductive layer such as an indium tin oxide (ITO), an indium zinc oxide (IZO), a zinc oxide (ZnO), and indium tin zinc oxide (ITZO). In the embodiment of the present disclosure, the second light emitting element electrode LDE2 may be formed of a multi-film of a double film or more including a metal thin film, for example, may be formed of a triple-film of ITO/Ag/ITO.

The second light emitting element electrode LDE2 may be formed of a metal reflective film and/or a transparent conductive film when an image is to be provided in a lower direction of the substrate SUB, and it may be formed of a transparent conductive film when an image is to be provided in an upper direction of the substrate SUB.

A set of the first light emitting element electrode LDE1, the emission film EML, and the second light emitting element electrode LDE2 described above may be referred to as a light emitting element.

The encapsulation film TFE may be provided on the second light emitting element electrode LDE2. The encapsulation film TFE may be formed as a single layer, but may also be formed as a multilayer. In the present embodiment, the encapsulation film TFE may include first to third encapsulation films ENC1, ENC2, and ENC3. The first to third encapsulation films ENC1, ENC2, and ENC3 may be made of an organic material and/or an inorganic material. The third encapsulation film ENC3 disposed at the outermost part of the encapsulation film TFE may be made of an inorganic material. For example, the first encapsulation film ENC1 may be an inorganic film made of an inorganic material, the second encapsulation film ENC2 may be an organic film made of an organic material, and the third encapsulation film ENC3 may be an inorganic film made of an inorganic material. The inorganic material has lower moisture and oxygen permeability than the organic material but is more susceptible to cracking due to its reduced elasticity. To prevent crack propagation, the first encapsulation film ENC1 and the third encapsulation film ENC3 can be formed of an inorganic material, while the second encapsulation film ENC2 can be made with an organic material. Here, the layer made of the organic material, in other words, the second encapsulation film ENC2 may be completely covered by the third encapsulation film ENC3 so that an end portion thereof is not exposed to the outside. As the organic material, an organic insulating material such as a polyacrylic compound, a polyimide compound, a fluorine-based carbon compound such as Teflon, a benzocyclobutene compound, and the like may be used, and as the inorganic material, polysiloxane, a silicon nitride, a silicon oxide, a silicon oxynitride, and the like may be used.

The emission film EML forming the light emitting element may be easily damaged by moisture or oxygen from the outside. The encapsulation film TFE protects the emission film EML by covering it. The encapsulation film TFE covers the display area DA, and may extend to the non-display area NDA outside the display area DA. While insulating films made of an organic material offer advantages in terms of flexibility and elasticity, they permit greater moisture and oxygen permeability compared to those made of an inorganic material. In the embodiment of the present disclosure, to prevent moisture or oxygen penetration through the organic insulating films, the end portions of these films may be covered by the inorganic insulating to shield them from exposure to the outside. For example, the first via film VIA1, the second via film VIA2, and pixel defining film PDL made of an organic material do not continuously extend to the non-display area NDA, and may be covered by the first encapsulation film ENC1. Accordingly, an upper surface of the pixel defining film PDL, the first via film VIA1, the second via film VIA2, and a side surface of the pixel defining film PDL are encapsulated by the encapsulation film TFE including an inorganic material, so that they may be prevented to be exposed to the outside.

However, the encapsulation film TFE may either be multi-layered or single layered, and the material used is not limited, allowing for various modifications. For example, the encapsulation film TFE may include a plurality of organic material layers and a plurality of inorganic material layers alternately stacked.

A first sensing electrode layer ISM1 may be disposed on the encapsulation film TFE. In some embodiments, an additional buffer film may be disposed between the first sensing electrode layer ISM1 and the encapsulation film TFE. The first sensing electrode layer ISM1 may be formed of a metal film such as Ag, Mg, Al, Pt, Pd, Au, Ni, Nd, Ir, Cr, and/or a transparent conductive layer such as an indium tin oxide (ITO), an indium zinc oxide (IZO), a zinc oxide (ZnO), and indium tin zinc oxide (ITZO).

A first sensing insulating film ISI1 may be present on the first sensing electrode layer ISM1. The first sensing insulating film ISI1 may be an inorganic insulating film made of an inorganic material. As the inorganic material, an inorganic insulating material such as polysiloxane, a silicon nitride, a silicon oxide, or a silicon oxynitride may be used.

A second sensing electrode layer ISM2 may be present on the first sensing insulating film ISI1. The second sensing electrode layer ISM2 may be formed of a metal film such as Ag, Mg, Al, Pt, Pd, Au, Ni, Nd, Ir, Cr, and/or a transparent conductive layer such as an indium tin oxide (ITO), an indium zinc oxide (IZO), a zinc oxide (ZnO), and indium tin zinc oxide (ITZO).

Various input detectors may be configured by using the first sensing electrode layer ISM1, the first sensing insulating film ISI1, and the second sensing electrode layer ISM2, which will be described later in FIG. 21 to FIG. 23.

In the embodiment of FIG. 19, the second sensing electrode layer ISM2 may be patterned to configure a first pattern IST1a of the first sensing wire IST1.

A second sensing insulating film ISI2 may be present on the second sensing electrode layer ISM2. The second sensing insulating film ISI2 may be formed of an organic film. For example, as the organic material, an organic insulating material such as a polyacrylic compound, a polyimide compound, a fluorine-based carbon compound such as Teflon, a benzocyclobutene compound, and the like may be used. For example, the second sensing insulating film ISI2 may be made of polymethyl methacrylate, polydimethylsiloxane, polyimide, acrylate, polyethylene terephthalate, or polyethylen naphthalate.

Hereinafter, the non-display area NDA, the first additional area ADA1, and the second additional area ADA2 will be described. In the cross-sectional view, since the distinction between the non-display area NDA and the first additional area ADA1 is not a feature, the non-display area NDA and the first additional area ADA1 will not be separately described. The description of the non-display area NDA and the second additional area ADA2 will omit previously covered content to avoid redundancy.

A dam DAM may be disposed at a boundary of the second encapsulation film ENC2. For example, the dam DAM may be disposed between a planarization film FLT and the second encapsulation film ENC2. The dam DAM may have a multi-layered structure, and for example, may include a first dam DAM1 and a second dam DAM2. For example, the first and second dams DAM1 and DAM2 may be made of an organic material. Each of the first and second dams DAM1 and DAM2 may correspond to one of the first via film VIAL, the second via film VIA2, and the pixel defining film PDL.

For example, when the first dam DAM1 is made of the same material through the same process as the first via film VIA1, the second dam DAM2 may be made of the same material through the same process as the second via film VIA2 or the pixel defining film PDL. As another example, when the first dam DAM1 is made of the same material through the same process as the second via film VIA2, the second dam DAM2 may be made of the same material through the same process as the pixel defining film PDL. In addition, when a spacer is formed on the pixel defining film PDL of the display area DA, the dam DAM may be formed by using the same material as the spacer.

The dam DAM prevents the organic material of the second encapsulation film ENC2, which has strong fluidity, from overflowing to the outside of the dam DAM during the process. The first and third encapsulation films ENC1 and ENC3 made of an inorganic material cover the dam DAM and extend beyond it, thereby enhancing adhesion to the substrate SUB or other films on the substrate SUB.

The first pad PDE1 is disposed on the substrate SUB, but may be spaced apart from the planarization film FLT. The first pad PDE1 may be supported by the second insulating film group ING2. Respective insulating films of the second insulating film group IN2 may correspond to respective insulating films of the first insulating film group IN1. The first pad PDE1 may include a first pad electrode PDE1a and a second pad electrode PDE1b. The first pad electrode PDE1a may be made of the same material as the first connection pattern CNP1. The second pad electrode PDE1b may be made of the same material as the second connection pattern CNP2.

The planarization film FLT is disposed on the substrate SUB, but may be spaced apart from an area covered by the encapsulation film TFE. The planarization film FLT may be an organic insulating film made of an organic material. As the organic material, an organic insulating material such as a polyacrylic compound, a polyimide compound, a fluorine-based carbon compound such as Teflon, a benzocyclobutene compound, and the like may be used.

In the present embodiment, the planarization film FLT may be formed after the interlayer insulating film ILD is formed and before the first connection pattern CNP1 is formed. Accordingly, the planarization film FLT and the first via film VIA1 may be formed through different processes. In some embodiments, the planarization film FLT and the first via film VIA1 may include different organic materials.

One end of the planarization film FLT may cover the first insulating film group ING1. In addition, a portion of the planarization film FLT corresponding to the second bending area BA2 may fill a first trench TCH1 between the first insulating film group ING1 and the second insulating film group ING2.

Since the inorganic insulating films have high hardness and low flexibility compared with the organic insulating films, the probability of crack formation is relatively high. When cracks occur in the inorganic insulating films, the cracks may propagate to wires on the inorganic insulating films, and eventually, defects such as wire breakage may occur.

Accordingly, as shown in FIG. 19, the inorganic insulating films are removed from the second bending area BA2, so that the first trench TCH1 may be formed, and the first insulating film group ING1 and the second insulating film group ING2 may be divided. In the present embodiment, it is shown that all of the inorganic insulating films corresponding to an area of the first trench TCH1 are removed, but in another embodiment, some of the inorganic insulating films may remain. In this case, some of the remaining inorganic insulating films may include slits, thereby dispersing bending stress.

A second pattern IST1*b* of the first sensing wire IST1 may be extended on the planarization film FLT, and may be electrically connected to the first pad PDE1. In the present embodiment, the second pattern IST1*b* may be made of the same material as the first connection pattern CNP1, through the same process.

A first wire protective film LPL1 may cover the planarization film FLT and the second pattern IST1*b*. In addition, a second wire protective film LPL2 may cover the first wire protective layer LPL1. In some embodiments, the second wire protective film LPL2 may be omitted. The first and second wire protective films LPL1 and LPL2 may be made of an organic material. Each of the first and second wire protective films LPL1 and LPL2 may correspond to one of the first via film VIA1, the second via film VIA2, and the pixel defining film PDL. For example, when the first wire protective film LPL1 is made of the same material through the same process as the first via film VIA1, the second wire protective layer LPL2 may be made of the same material through the same process as the second via film VIA2 or the pixel defining film PDL. As another example, when the first wire protective film LPL1 is made of the same material through the same process as the second via film VIA2, the second wire protective layer LPL2 may be made of the same material through the same process as the pixel defining film PDL.

The first and second wire protective films LPL1 and LPL2 and the first sensing insulating film ISI1 may include a first opening OPN1 exposing the second pattern IST1*b*.

The first pattern IST1*a* may be connected to the second pattern IST1*b* through the first opening OPN1. According to the present embodiment, a height of the second pattern IST1*b* disposed on one end of the first insulating film group ING1 and the planarization film FLT may be greater than a height of the second pattern IST1*b* disposed on the planarization film FLT corresponding to the first trench TCH1.

Accordingly, the first pattern IST1*a* and the second pattern IST1*b* may be directly connected without an bridge wire, to improve the connection reliability between the first pattern IST1*a* and the second pattern IST1*b*. In addition, reducing the length of the non-display area NDA by the length of the bridge wire allows for a decrease in dead space, facilitating the realization of a thin bezel.

A third pattern IST1*c* of the first sensing wire IST1 may connect the first pad PDE1 and the second pattern IST1*b*. The third pattern IST1*c* may be made of the same material and by the same process as the gate electrode GE of the transistor. In some embodiments, the third pattern IST1*c* may be made of the same material and by the same process as the upper electrode UE. In some embodiments, an odd numbered third pattern IST1*c* may be formed of the same material and in the same process as the gate electrode GE of the transistor, and an even numbered third pattern IST1*c* may be formed of the same material and in the same process as the upper electrode UE. Conversely, the even numbered third pattern IST1*c* may be formed of the same material and in the same process as the gate electrode GE of the transistor, and the odd numbered third pattern IST1*c* may be formed of the same material and in the same process as the upper electrode UE. Accordingly, a short circuit between adjacent wires may be more efficiently prevented.

The second insulating film group ING2 may include a second opening OPN2 exposing the third pattern IST1*c*. In addition, the planarization film FLT may include an opening corresponding to the second opening OPN2. The second pattern IST1*b* may be connected to the third pattern IST1*c* through the second opening OPN2.

Figure 20:
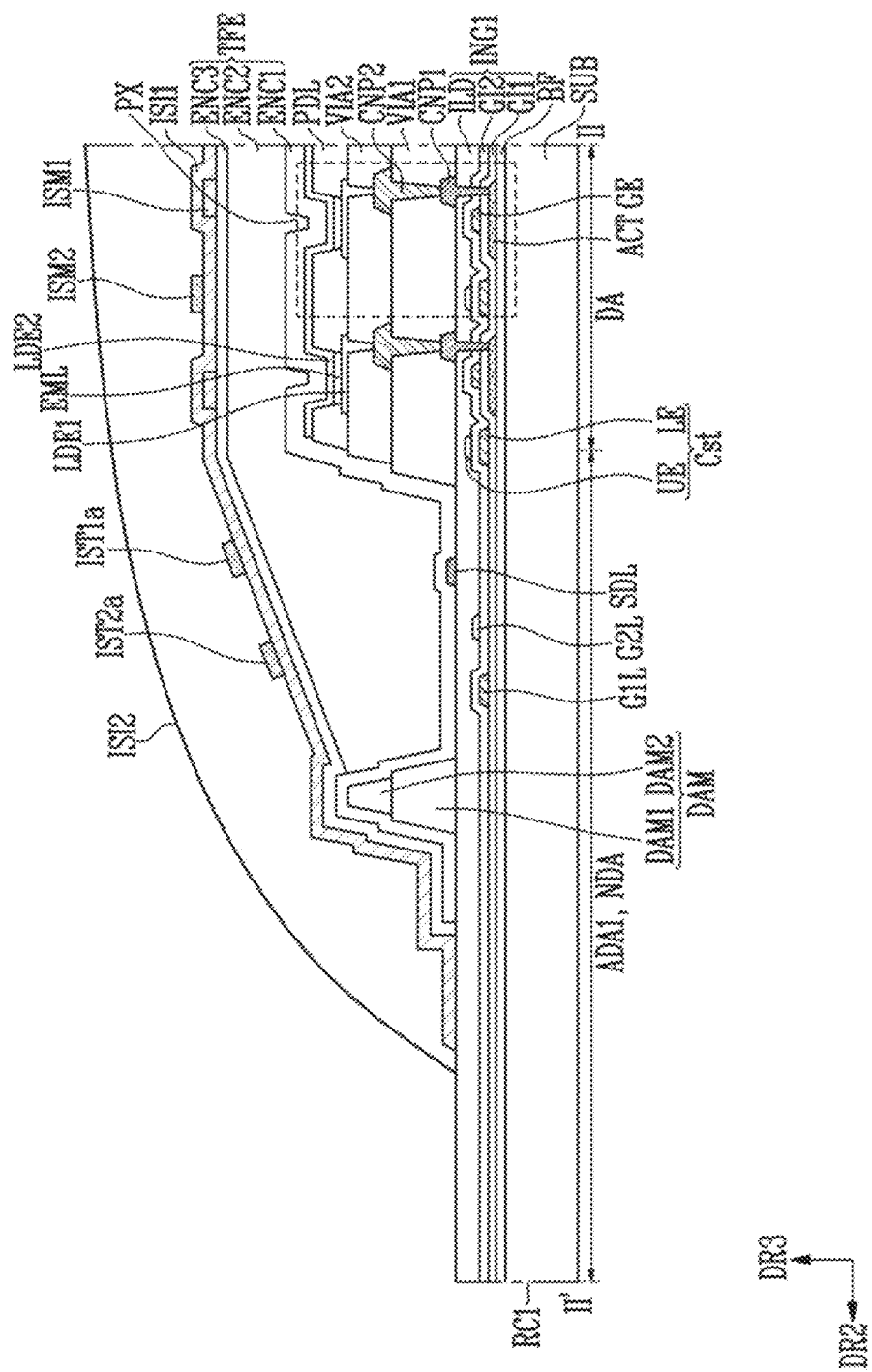

FIG. 20 is a cross-sectional view taken along line II-II' of FIG. 18.

The line II-II' of FIG. 18 may correspond to the first bending axis BX1. However, the same embodiment may be applied to not only the first lateral surface RC1 but also the second lateral surface RC2.

The display wires DST may be configured of a single-layered wire or a multi-layered wire by using at least one of wires G1L, G2L, and SDL. The wire G1L may be made of the same material and by the same process as the gate electrode GE. The wire G2L may be made of the same material and by the same process as the upper electrode UE. The wire SDL may be made of the same material and by the same process as the first connection pattern CNP1.

The patterns IST1*a* and IST12*a* of the sensing wires IST1 and IST2 are disposed on the encapsulation film TFE and the first sensing insulating film ISI1 (based on the third direction DR3), and are disposed between the dam DAM and the display area DA (based on the second direction DR2). The first sensing insulating film ISI1 may be disposed between the encapsulation film TFE and the sensing wires IST1 and IST2.

Figure 21:
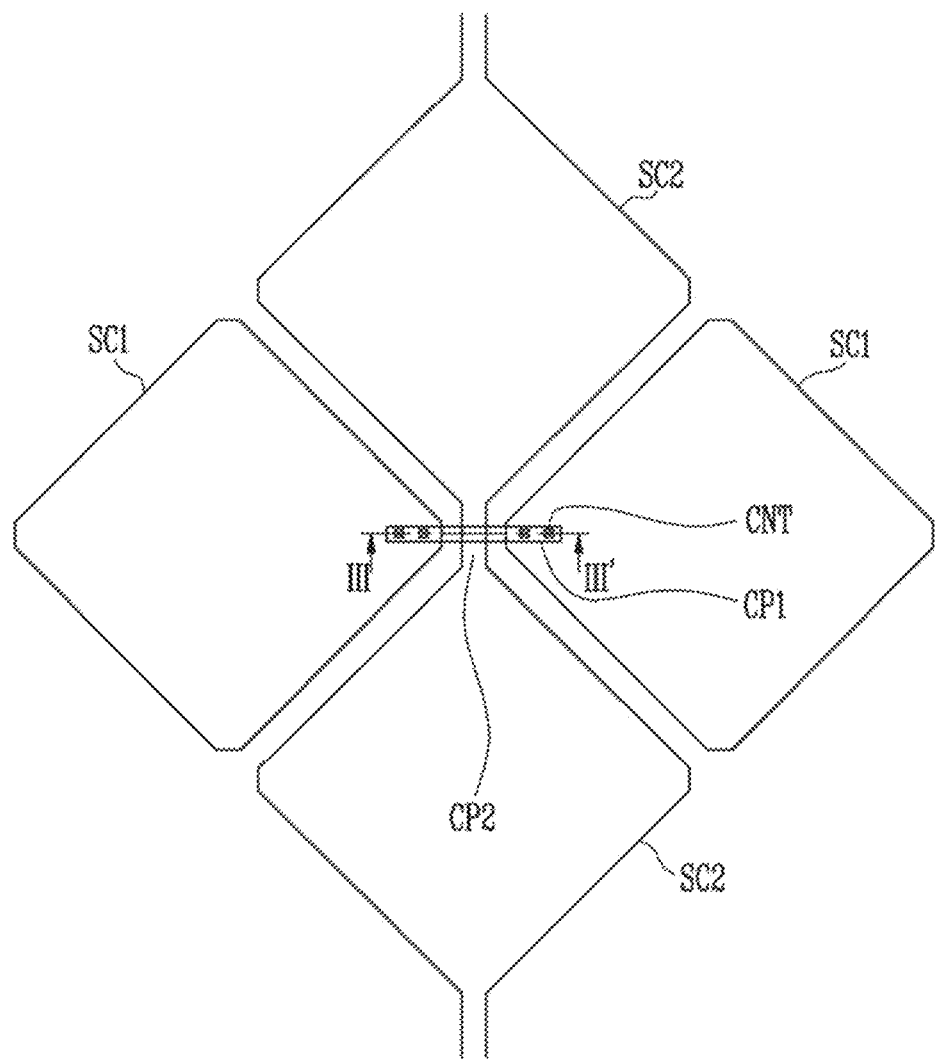
Figure 22:
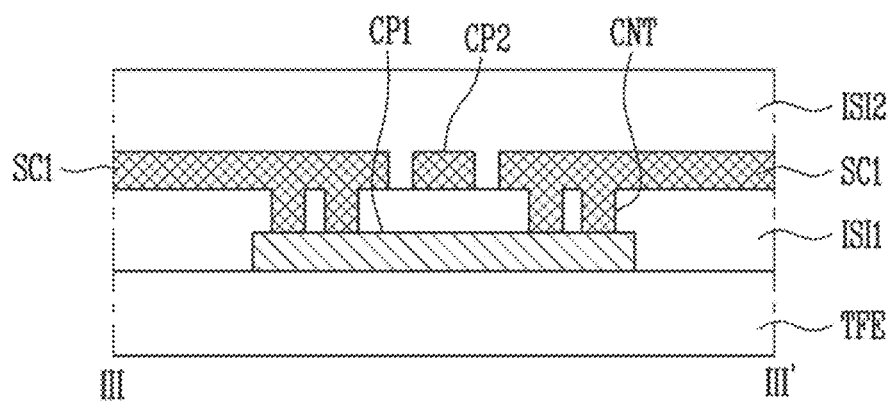

FIG. 21 and FIG. 22 illustrate sensing electrodes and bridge electrodes according to an embodiment of the present disclosure. FIG. 22 illustrates a cross-sectional view taken along line III-III' of FIG. 21.

Bridge electrodes CP1 may be disposed on the encapsulation film TFE by patterning the first sensing electrode layer ISM1.

The first sensing insulating film ISI1 covers the bridge electrode CP1, and may include contact holes CNT exposing some of the bridge electrodes CP1.

The first sensing electrodes SC1 and the second sensing electrodes SC2 may be formed on the first sensing insulating film ISI1 by patterning the second sensing electrode layer ISM2. The first sensing electrodes SC1 may be connected to the bridge electrode CP1 through the contact holes CNT.

The second sensing electrodes SC2 may have a connection pattern CP2 in the same layer by patterning the second sensing electrode layer ISM2. Accordingly, a separate bridge electrode may not be needed to connect the second sensing electrodes SC2.

In some embodiments, each of the sensing electrodes SC1 and SC2 may cover a plurality of pixels PX. In this case, if each of the sensing electrodes SC1 and SC2 is made of an opaque conductive film, they may include a plurality of openings that expose the plurality of pixels PX underneath. For example, each of the sensing electrodes SC1 and SC2 may be configured in a mesh shape. Conversely, if each of the sensing electrodes SC1 and SC2 is formed of a transparent conductive film, they may be constructed as a plate without openings.

Figure 23:
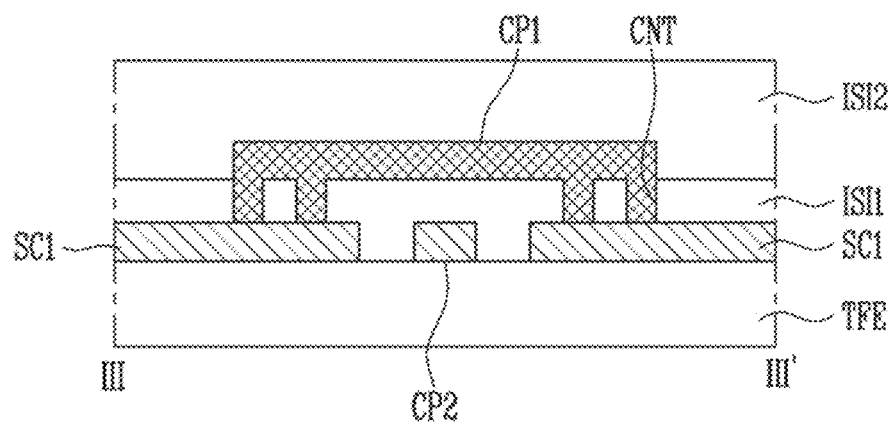

FIG. 23 illustrates sensing electrodes and bridge electrodes according to another embodiment of the present disclosure.

FIG. 23 illustrates another cross-sectional view taken along line III-III' of FIG. 21.

The first sensing electrodes SC1 and the second sensing electrodes SC2 may be formed by patterning the first sensing electrode layer ISM1 to be disposed on the encapsulation film TFE.

The first sensing insulating film ISI1 may cover the first sensing electrodes SC1 and the second sensing electrodes SC2, and may include the contact holes CNT exposing some of the first sensing electrodes SC1.

The bridge electrodes CP1 may be formed by patterning the second sensing electrode layer ISM2 to be disposed on the first sensing insulating film ISI1. The bridge electrodes CP1 may be connected to the first sensing electrodes SC1 through the contact holes CNT.

Figure 24:
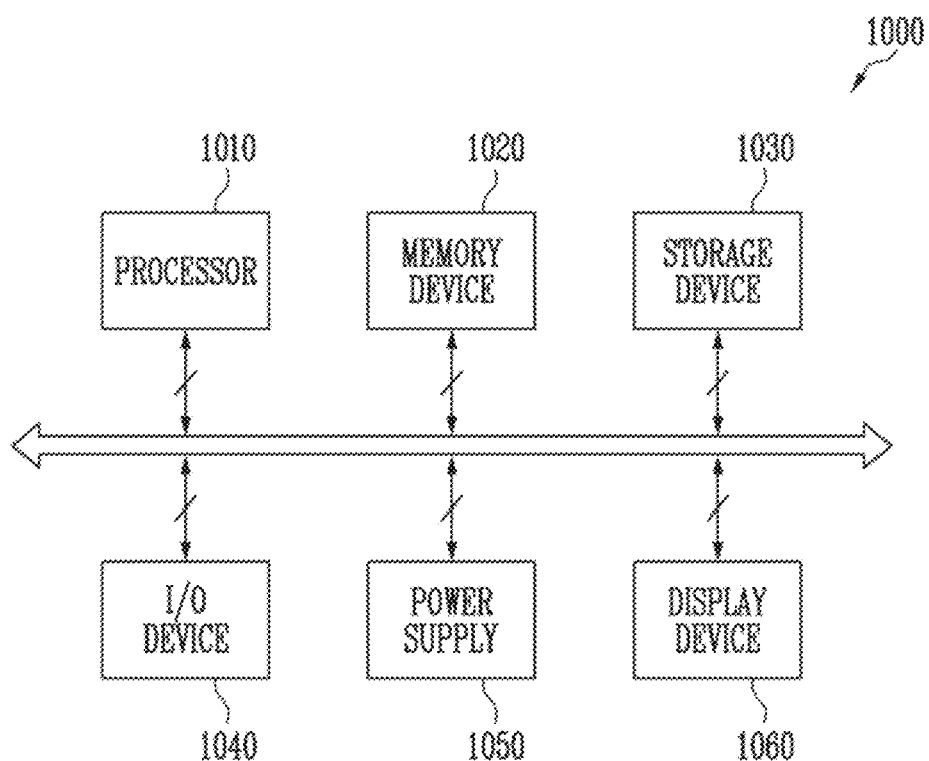
FIG. 24 is a schematic block diagram illustrating an electronic device including a display device in accordance with an embodiment.
Figure 25:
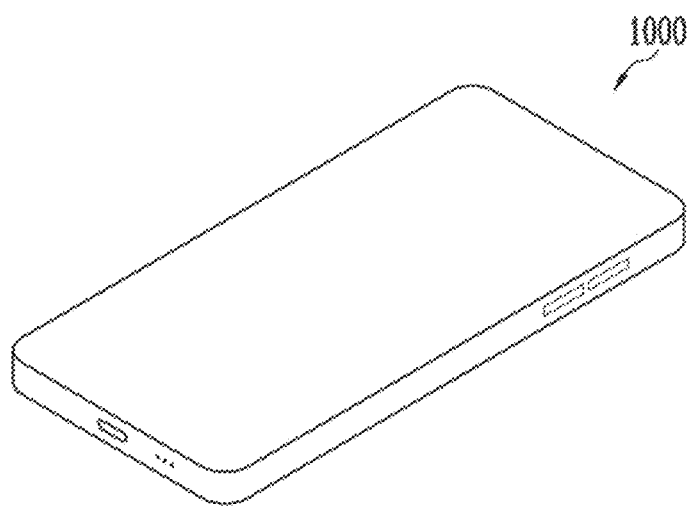
FIG. 25 is a schematic diagram illustrating an example where the electronic device of FIG. 24 is a smartphone.
Figure 26:
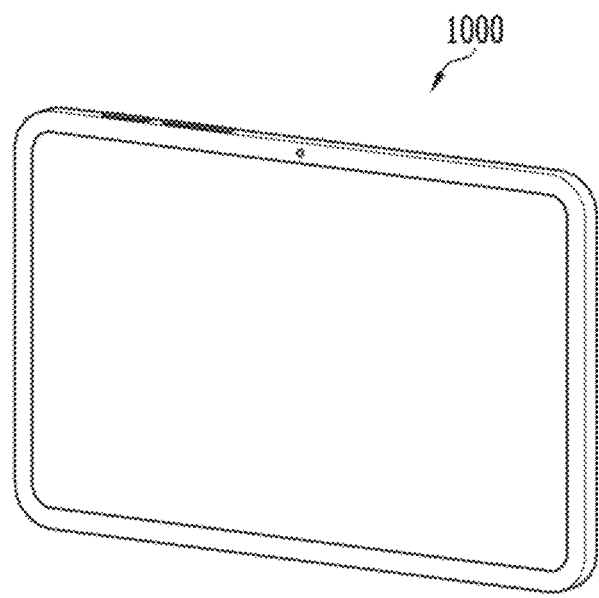
FIG. 26 is a schematic diagram illustrating an example where the electronic device of FIG. 24 is a tablet computer.

FIG. 24 is a schematic block diagram illustrating an electronic device 1000 including a display device in accordance with an embodiment. FIG. 25 is a schematic diagram illustrating an example where the electronic device 1000 of FIG. 24 is a smartphone. FIG. 26 is a schematic diagram illustrating an example where the electronic device 1000 of FIG. 24 is a tablet computer.

Referring to FIGS. 24 to 26, the electronic device 1000 may include a processor 1010, a memory device 1020, a storage device 1030, an input/output (I/O) device 1040, a power supply 1050, and a display device 1060. The display device 1060 may be the display device 1 of FIG. 1. The electronic device 1000 may further include various ports for communication with a video card, a sound card, a memory card, a USB device, or other systems. In an embodiment, as illustrated in FIG. 25, the electronic device 1000 may be a smartphone. In an embodiment, as illustrated in FIG. 26, the electronic device 1000 may be a tablet computer. However, the aforementioned examples are illustrative, and the electronic device 1000 is not necessarily limited to the aforementioned examples. For example, the electronic device 1000 may be a cellular phone, a video phone, a smart pad, a smartwatch, a navigation device for vehicles, a computer monitor, a laptop computer, a head-mounted display device, or the like.

The processor 1010 may perform specific calculations or tasks. In an embodiment, the processor 1010 may be a microprocessor, a central processing unit, an application processor, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to control signals or data from the processor 1010. The display device 1060 may be connected to other components through the buses or other communication links.

While this disclosure has been described in connection with what are considered practical embodiments, it is to be understood that the disclosure is not limited to these embodiments. Instead, it is intended to cover various modifications and equivalent arrangements within the spirit and scope of the appended claims. Therefore, those skilled in the art will recognize that various modifications and equivalent embodiments of the present disclosure are possible.

What is claimed is:

1. A display device comprising:
   first sensors;
   second sensors forming a capacitance with the first sensors;
   a sensor transmitter connected to the first sensors and configured to supply driving signals to the first sensors; and
   a sensor receiver connected to the second sensors and configured to receive sensing signals from the second sensors,
   wherein the sensor receiver includes an analog front-end connected to a (2-1)-th sensor and a (2-2)-th sensor of the second sensors, and
   the analog front-end is configured to output a differential signal of a (2-1)-th sensing signal from the (2-1)-th sensor and a (2-2)-th sensing signal from the (2-2)-th sensor in a first sensing mode, and output each of the (2-1)-th sensing signal and the (2-2)-th sensing signal in a time division manner in a second sensing mode.

2. The display device of claim 1, wherein
   the differential signal outputted in the first sensing mode is used to determine a touch position, and
   the (2-1)-th sensing signal outputted in the second sensing mode is set as a baseline of the (2-1)-th sensor, and the (2-2)-th sensing signal outputted in the second sensing mode is set as a baseline of the (2-2)-th sensor.

3. The display device of claim 2, wherein
   when the display device operates in the first display mode, the analog front-end operates only in the first sensing mode, and
   when the display device operates in the second display mode, the analog front-end alternates between the first sensing mode and the second sensing mode.

4. The display device of claim 3, wherein
   when the display device operates in a third display mode, the analog front-end operates only in the second sensing mode.

5. The display device of claim 4, wherein
   the first display mode is a normal display mode in which an image is displayed,
   the second display mode is an idle display mode in which an image is displayed, but no user input is detected for a certain period of time, and
   the third display mode is a low-power display mode in which no image is displayed, or only minimal information is displayed.

6. The display device of claim 1, wherein
   the analog front-end includes a first charge amplifier and a second charge amplifier, in the first sensing mode, the (2-1)-th sensor and the (2-2)-th sensor are connected to a first input terminal and a second input terminal of the first charge amplifier, and in the second sensing mode, the (2-1)-th sensor is connected to the first input terminal of the first charge amplifier, and the (2-2)-th sensor is connected to a first input terminal of the second charge amplifier.

7. The display device of claim 6, wherein
the first charge amplifier is a fully differential amplifier, and
the second charge amplifier is a differential amplifier with a single-ended output.

8. The display device of claim 6, wherein
in the second sensing mode, the second input terminal of the first charge amplifier is connected to a reference node.

9. The display device of claim 6, wherein
the analog front-end further includes:
a first filter circuit connected to output terminals of the first charge amplifier;
a second filter circuit connected to an output terminal of the second charge amplifier; and
an analog-to-digital converter.

10. The display device of claim 9, wherein
in the first sensing mode, output terminals of the first filter circuit are connected to the analog-to-digital converter, and
in the second sensing mode, a first output terminal of the first filter circuit and an output terminal of the second filter circuit are alternately connected to the analog-to-digital converter.

11. A driving method of a display device, comprising:
supplying, by a sensor transmitter, driving signals to first sensors; and
receiving, by a sensor receiver, sensing signals from second sensors that form a capacitance with the first sensors,
wherein the sensor receiver includes an analog front-end connected to a (2-1)-th sensor and a (2-2)-th sensor of the second sensors, and
the analog front-end outputs a differential signal of a (2-1)-th sensing signal from the (2-1)-th sensor and a (2-2)-th sensing signal from the (2-2)-th sensor in a first sensing mode, and outputs the (2-1)-th sensing signal and the (2-2)-th sensing signal in a time division manner in a second sensing mode.

12. The driving method of the display device of claim 11, wherein
the differential signal outputted in the first sensing mode is used to determine a touch position, and
the (2-1)-th sensing signal outputted in a second sensing mode is set as a base line of the (2-1)-th sensor, and the (2-2)-th sensing signal outputted in the second sensing mode is set as a base line of the (2-2)-th sensor.

13. The driving method of the display device of claim 12, wherein
when the display device operates in the first display mode, the analog front-end operates only in the first sensing mode, and
when the display device operates in the second display mode, the analog front-end alternates between the first sensing mode and the second sensing mode.

14. The driving method of the display device of claim 13, wherein when the display device operates in a third display mode, the analog front-end operates only in the second sensing mode.

15. The driving method of the display device of claim 14, wherein
the first display mode is a normal display mode in which an image is displayed,
the second display mode is an idle display mode in which an image is displayed, but no user input is detected for a certain period of time, and
the third display mode is a low-power display mode in which no image is displayed, or only minimal information is displayed.

16. The driving method of the display device of claim 11, wherein
the analog front-end includes a first charge amplifier and a second charge amplifier,
in the first sensing mode, the (2-1)-th sensor and the (2-2)-th sensor are connected to a first input terminal and a second input terminal of the first charge amplifier, and
in the second sensing mode, the (2-1)-th sensor is connected to the first input terminal of the first charge amplifier, and the (2-2)-th sensor is connected to a first input terminal of the second charge amplifier.

17. The driving method of the display device of claim 16, wherein
the first charge amplifier is a fully differential amplifier, and
the second charge amplifier is a differential amplifier with a single-ended output.

18. The driving method of the display device of claim 16, wherein
in the second sensing mode, the second input terminal of the first charge amplifier is connected to a reference node.

19. The driving method of the display device of claim 16, wherein
the analog front-end further includes:
a first filter circuit connected to output terminals of the first charge amplifier;
a second filter circuit connected to an output terminal of the second charge amplifier; and
an analog-to-digital converter.

20. The driving method of the display device of claim 19, wherein
in the first sensing mode, output terminals of the first filter circuit are connected to the analog-to-digital converter, and
in the second sensing mode, a first output terminal of the first filter circuit and an output terminal of the second filter circuit are alternately connected to the analog-to-digital converter.

21. An electronic device comprising:
a processor to provide input image data; and
a display device to display an image based on the input image data, the display device comprising:
first sensors;
second sensors forming a capacitance with the first sensors;
a sensor transmitter connected to the first sensors and configured to supply driving signals to the first sensors; and
a sensor receiver connected to the second sensors and configured to receive sensing signals from the second sensors, wherein the sensor receiver includes an analog front-end connected to a (2-1)-th sensor and a (2-2)-th sensor of the second sensors, and the analog front-end is configured to output a differential signal of a (2-1)-th sensing signal from the (2-1)-th sensor and a (2-2)-th sensing signal from the (2-2)-th sensor in a first sensing mode, and output each of the (2-1)-th sensing signal and the (2-2)-th sensing signal in a time division manner in a second sensing mode.

* * * * *